US012614839B2

(12) United States Patent
Li

(10) Patent No.: US 12,614,839 B2
(45) Date of Patent: *Apr. 28, 2026

(54) WAVEGUIDE WITH RADIATION SLOTS AND PARASITIC ELEMENTS FOR ASYMMETRICAL COVERAGE

(71) Applicant: Aptiv Technologies AG, Schaffhausen (CH)

(72) Inventor: Mingjian Li, Santa Clara, CA (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,098

(22) Filed: Jun. 14, 2023

(65) Prior Publication Data

US 2023/0327330 A1     Oct. 12, 2023

Related U.S. Application Data

(63) Continuation of application No. 17/234,424, filed on Apr. 19, 2021, now Pat. No. 11,749,883.

(Continued)

(51) Int. Cl.
*H01Q 1/32* (2006.01)
*G01S 13/931* (2020.01)
(Continued)

(52) U.S. Cl.
CPC ......... *H01Q 1/3233* (2013.01); *G01S 13/931* (2013.01); *H01P 3/121* (2013.01);
(Continued)

(58) Field of Classification Search
CPC .... H01Q 1/3233; H01Q 13/106; H01Q 19/22; H01Q 21/0043; G01S 13/931; H01P 3/121
See application file for complete search history.

(56) References Cited

U.S. PATENT DOCUMENTS 2,851,686 A     9/1958  Hagaman
3,029,432 A     4/1962  Hansen
(Continued)

FOREIGN PATENT DOCUMENTS

CA     2654470 A1    12/2007
CN     1254446 A      5/2000
(Continued)

OTHER PUBLICATIONS

Xu, et al., "CPW Center-Fed Single-Layer SIW Slot Antenna Array for Automotive Radars", Jun. 12, 2014, pp. 4528-4536.
(Continued)

*Primary Examiner* — Dameon E Levi
*Assistant Examiner* — Yonchan J Kim
(74) *Attorney, Agent, or Firm* — Harness, Dickey & Pierce, P.L.C.

(57)     ABSTRACT

This document describes a waveguide with radiation slots and parasitic elements for asymmetrical coverage. An apparatus may include a waveguide for providing asymmetrical coverage in an azimuth plane. The waveguide includes a hollow channel containing a dielectric and an array of radiation slots through a surface that is operably connected with the dielectric. The waveguide includes an array of parasitic elements positioned on or in the surface and offset from a longitudinal side of the array of radiation slots. The radiation slots and parasitic elements configure the described waveguide to focus an antenna radiation pattern that provides an asymmetrical coverage to focus on a particular portion within the antenna field-of-view.

19 Claims, 8 Drawing Sheets

Related U.S. Application Data

(60) Provisional application No. 63/169,111, filed on Mar. 31, 2021, provisional application No. 63/127,819, filed on Dec. 18, 2020, provisional application No. 63/127,873, filed on Dec. 18, 2020, provisional application No. 63/127,861, filed on Dec. 18, 2020.

(51) Int. Cl.

| | |
|---|---|
| *H01P 3/12* | (2006.01) |
| *H01Q 13/10* | (2006.01) |
| *H01Q 19/22* | (2006.01) |
| *H01Q 21/00* | (2006.01) |

(52) U.S. Cl.
CPC ........... *H01Q 13/106* (2013.01); *H01Q 19/22* (2013.01); *H01Q 21/0043* (2013.01)

(56) References Cited

U.S. PATENT DOCUMENTS

| | | | |
|---|---|---|---|
| 3,032,762 A | | 5/1962 | Kerr |
| 3,328,800 A | | 6/1967 | Algeo |
| 3,462,713 A | | 8/1969 | Knerr |
| 3,473,162 A | | 10/1969 | Veith |
| 3,579,149 A | | 5/1971 | Ramsey |
| 3,594,806 A | | 7/1971 | Black et al. |
| 3,597,710 A | | 8/1971 | Levy |
| 3,822,689 A | | 7/1974 | Oshima |
| 3,852,689 A | | 12/1974 | Watson |
| 4,157,516 A | | 6/1979 | Grijp |
| 4,291,312 A | | 9/1981 | Kaloi |
| 4,453,142 A | | 6/1984 | Murphy |
| 4,562,416 A | | 12/1985 | Sedivec |
| 4,590,480 A | * | 5/1986 | Nikolayuk ............. H01Q 21/29 |
| | | | 343/771 |
| 4,839,663 A | | 6/1989 | Kurtz |
| 5,030,965 A | | 7/1991 | Park et al. |
| 5,047,738 A | | 9/1991 | Wong et al. |
| 5,065,123 A | | 11/1991 | Heckaman et al. |
| 5,068,670 A | | 11/1991 | Maoz |
| 5,113,197 A | | 5/1992 | Luh |
| 5,337,065 A | | 8/1994 | Bonnet et al. |
| 5,350,499 A | | 9/1994 | Shibaike et al. |
| 5,541,612 A | | 7/1996 | Josefsson |
| 5,638,079 A | | 6/1997 | Kastner et al. |
| 5,923,225 A | | 7/1999 | Santos |
| 5,926,147 A | | 7/1999 | Sehm et al. |
| 5,982,256 A | | 11/1999 | Uchimura et al. |
| 5,986,527 A | | 11/1999 | Ishikawa et al. |
| 6,072,375 A | | 6/2000 | Adkins et al. |
| 6,166,701 A | | 12/2000 | Park et al. |
| 6,414,573 B1 | | 7/2002 | Swineford et al. |
| 6,489,855 B1 | | 12/2002 | Kitamori et al. |
| 6,535,083 B1 | | 3/2003 | Hageman et al. |
| 6,622,370 B1 | | 9/2003 | Sherman et al. |
| 6,788,918 B2 | | 9/2004 | Saitoh et al. |
| 6,794,950 B2 | | 9/2004 | Toit et al. |
| 6,859,114 B2 | | 2/2005 | Eleftheriades et al. |
| 6,867,660 B2 | | 3/2005 | Kitamori et al. |
| 6,958,662 B1 | | 10/2005 | Salmela et al. |
| 6,992,541 B2 | | 1/2006 | Wright et al. |
| 7,002,511 B1 | | 2/2006 | Ammar et al. |
| 7,091,919 B2 | * | 8/2006 | Bannon .................. H01Q 13/12 |
| | | | 343/768 |
| 7,142,165 B2 | | 11/2006 | Sanchez et al. |
| 7,420,442 B1 | | 9/2008 | Forman |
| 7,439,822 B2 | | 10/2008 | Shimura et al. |
| 7,495,532 B2 | | 2/2009 | McKinzie, III |
| 7,498,994 B2 | | 3/2009 | Vacanti |
| 7,626,476 B2 | | 12/2009 | Kim et al. |
| 7,659,799 B2 | | 2/2010 | Jun et al. |
| 7,886,434 B1 | | 2/2011 | Forman |
| 7,973,616 B2 | | 7/2011 | Shijo et al. |
| 7,994,879 B2 | | 8/2011 | Kim et al. |
| 8,013,694 B2 | | 9/2011 | Hiramatsu et al. |

| | | | |
|---|---|---|---|
| 8,058,998 B2 | | 11/2011 | Burnside et al. |
| 8,089,327 B2 | | 1/2012 | Margomenos et al. |
| 8,159,316 B2 | | 4/2012 | Miyazato et al. |
| 8,395,552 B2 | | 3/2013 | Geiler et al. |
| 8,451,175 B2 | | 5/2013 | Gummalla et al. |
| 8,451,189 B1 | | 5/2013 | Fluhler |
| 8,576,023 B1 | | 11/2013 | Buckley et al. |
| 8,604,990 B1 | | 12/2013 | Chen et al. |
| 8,692,731 B2 | | 4/2014 | Lee et al. |
| 8,717,124 B2 | | 5/2014 | Vanhille et al. |
| 8,803,638 B2 | | 8/2014 | Kildal |
| 8,948,562 B2 | | 2/2015 | Norris et al. |
| 9,007,269 B2 | | 4/2015 | Lee et al. |
| 9,203,139 B2 | | 12/2015 | Zhu et al. |
| 9,203,155 B2 | | 12/2015 | Choi et al. |
| 9,246,204 B1 | | 1/2016 | Kabakian |
| 9,258,884 B2 | | 2/2016 | Saito |
| 9,356,238 B2 | | 5/2016 | Norris et al. |
| 9,368,878 B2 | | 6/2016 | Chen et al. |
| 9,450,281 B2 | | 9/2016 | Kim |
| 9,537,212 B2 | | 1/2017 | Rosen et al. |
| 9,647,313 B2 | | 5/2017 | Marconi et al. |
| 9,653,773 B2 | | 5/2017 | Ferrari et al. |
| 9,653,819 B1 | | 5/2017 | Izadian |
| 9,673,532 B2 | | 6/2017 | Cheng et al. |
| 9,806,393 B2 | | 10/2017 | Kildal et al. |
| 9,806,431 B1 | | 10/2017 | Izadian |
| 9,813,042 B2 | | 11/2017 | Xue et al. |
| 9,843,301 B1 | | 12/2017 | Rodgers et al. |
| 9,882,288 B2 | | 1/2018 | Black et al. |
| 9,935,065 B1 | | 4/2018 | Baheti et al. |
| 9,991,606 B2 | | 6/2018 | Kirino et al. |
| 9,997,842 B2 | | 6/2018 | Kirino et al. |
| 10,027,032 B2 | | 7/2018 | Kirino et al. |
| 10,042,045 B2 | | 8/2018 | Kirino et al. |
| 10,090,600 B2 | | 10/2018 | Kirino et al. |
| 10,114,067 B2 | | 10/2018 | Lam et al. |
| 10,153,533 B2 | | 12/2018 | Kirino |
| 10,158,158 B2 | | 12/2018 | Kirino et al. |
| 10,164,318 B2 | | 12/2018 | Seok et al. |
| 10,164,344 B2 | | 12/2018 | Kirino et al. |
| 10,186,787 B1 | | 1/2019 | Wang et al. |
| 10,218,078 B2 | | 2/2019 | Kirino et al. |
| 10,230,173 B2 | | 3/2019 | Kirino et al. |
| 10,263,310 B2 | | 4/2019 | Kildal et al. |
| 10,283,832 B1 | | 5/2019 | Chayat et al. |
| 10,312,596 B2 | | 6/2019 | Gregoire |
| 10,315,578 B2 | | 6/2019 | Kim et al. |
| 10,320,083 B2 | | 6/2019 | Kirino et al. |
| 10,333,227 B2 | | 6/2019 | Kirino et al. |
| 10,374,323 B2 | | 8/2019 | Kamo et al. |
| 10,381,317 B2 | | 8/2019 | Maaskant et al. |
| 10,381,741 B2 | | 8/2019 | Kirino et al. |
| 10,439,298 B2 | | 10/2019 | Kirino et al. |
| 10,468,736 B2 | | 11/2019 | Mangaiahgari |
| 10,505,282 B2 | | 12/2019 | Lilja |
| 10,534,061 B2 | | 1/2020 | Vassilev et al. |
| 10,559,889 B2 | | 2/2020 | Kirino et al. |
| 10,594,045 B2 | | 3/2020 | Kirino et al. |
| 10,601,144 B2 | | 3/2020 | Kamo et al. |
| 10,608,345 B2 | | 3/2020 | Kirino et al. |
| 10,613,216 B2 | | 4/2020 | Vacanti et al. |
| 10,622,696 B2 | | 4/2020 | Kamo et al. |
| 10,627,502 B2 | | 4/2020 | Kirino et al. |
| 10,649,461 B2 | | 5/2020 | Han et al. |
| 10,651,138 B2 | | 5/2020 | Kirino et al. |
| 10,651,567 B2 | | 5/2020 | Kamo et al. |
| 10,658,760 B2 | | 5/2020 | Kamo et al. |
| 10,670,810 B2 | | 6/2020 | Sakr et al. |
| 10,705,294 B2 | | 7/2020 | Guerber et al. |
| 10,707,584 B2 | | 7/2020 | Kirino et al. |
| 10,714,802 B2 | | 7/2020 | Kirino et al. |
| 10,727,561 B2 | | 7/2020 | Kirino et al. |
| 10,727,611 B2 | | 7/2020 | Kirino et al. |
| 10,763,590 B2 | | 9/2020 | Kirino et al. |
| 10,763,591 B2 | | 9/2020 | Kirino et al. |
| 10,775,573 B1 | | 9/2020 | Hsu et al. |
| 10,811,373 B2 | | 10/2020 | Zaman et al. |
| 10,826,147 B2 | | 11/2020 | Sikina et al. |

(56) References Cited

U.S. PATENT DOCUMENTS

| | | |
|---|---|---|
| 10,833,382 B2 | 11/2020 | Sysouphat |
| 10,833,385 B2 | 11/2020 | Mangaiahgari |
| 10,892,536 B2 | 1/2021 | Fan et al. |
| 10,944,184 B2 | 3/2021 | Shi et al. |
| 10,957,971 B2 | 3/2021 | Doyle et al. |
| 10,957,988 B2 | 3/2021 | Kirino et al. |
| 10,962,628 B1 | 3/2021 | Laifenfeld et al. |
| 10,971,824 B2 | 4/2021 | Baumgartner et al. |
| 10,983,194 B1 | 4/2021 | Patel et al. |
| 10,985,434 B2 | 4/2021 | Wagner et al. |
| 10,992,056 B2 | 4/2021 | Kamo et al. |
| 11,061,110 B2 | 7/2021 | Kamo et al. |
| 11,088,432 B2 | 8/2021 | Seok et al. |
| 11,088,464 B2 | 8/2021 | Sato et al. |
| 11,114,733 B2 | 9/2021 | Doyle et al. |
| 11,121,441 B1 | 9/2021 | Rmili et al. |
| 11,121,475 B2 | 9/2021 | Yang et al. |
| 11,169,325 B2 | 11/2021 | Guerber et al. |
| 11,171,399 B2 | 11/2021 | Alexanian et al. |
| 11,196,171 B2 | 12/2021 | Doyle et al. |
| 11,201,414 B2 | 12/2021 | Doyle et al. |
| 11,249,011 B2 | 2/2022 | Challener |
| 11,283,162 B2 | 3/2022 | Doyle et al. |
| 11,289,787 B2 | 3/2022 | Yang |
| 11,349,183 B2 | 5/2022 | Rahiminejad et al. |
| 11,349,220 B2 | 5/2022 | Alexanian et al. |
| 11,378,683 B2 | 7/2022 | Alexanian et al. |
| 11,411,292 B2 | 8/2022 | Kirino |
| 11,444,364 B2 | 9/2022 | Shi |
| 11,495,871 B2 | 11/2022 | Vosoogh et al. |
| 11,563,259 B2 | 1/2023 | Alexanian et al. |
| 11,611,138 B2 | 3/2023 | Ogawa et al. |
| 11,616,282 B2 | 3/2023 | Yao et al. |
| 11,626,652 B2 | 4/2023 | Vilenskiy et al. |
| 2002/0021197 A1 | 2/2002 | Elco |
| 2003/0052828 A1 | 3/2003 | Scherzer et al. |
| 2004/0041663 A1 | 3/2004 | Uchimura et al. |
| 2004/0069984 A1 | 4/2004 | Estes et al. |
| 2004/0090290 A1 | 5/2004 | Teshirogi et al. |
| 2004/0174315 A1 | 9/2004 | Miyata |
| 2005/0146474 A1 | 7/2005 | Bannon |
| 2005/0237253 A1 | 10/2005 | Kuo et al. |
| 2006/0038724 A1 | 2/2006 | Tikhov et al. |
| 2006/0113598 A1 | 6/2006 | Chen et al. |
| 2006/0158382 A1 | 7/2006 | Nagai |
| 2007/0013598 A1 | 1/2007 | Artis et al. |
| 2007/0054064 A1 | 3/2007 | Ohmi et al. |
| 2007/0103381 A1 | 5/2007 | Upton |
| 2008/0129409 A1 | 6/2008 | Nagaishi et al. |
| 2008/0150821 A1 | 6/2008 | Koch et al. |
| 2009/0040132 A1 | 2/2009 | Sridhar et al. |
| 2009/0207090 A1 | 8/2009 | Pettus et al. |
| 2009/0243762 A1 | 10/2009 | Chen et al. |
| 2009/0243766 A1 | 10/2009 | Miyagawa et al. |
| 2009/0300901 A1 | 12/2009 | Artis et al. |
| 2010/0134376 A1 | 6/2010 | Margomenos et al. |
| 2010/0321265 A1* | 12/2010 | Yamaguchi .......... H01Q 21/005 |
| | | 343/771 |
| 2011/0181482 A1 | 7/2011 | Adams et al. |
| 2012/0013421 A1 | 1/2012 | Hayata |
| 2012/0050125 A1 | 3/2012 | Leiba et al. |
| 2012/0056776 A1 | 3/2012 | Shijo et al. |
| 2012/0068316 A1 | 3/2012 | Ligander |
| 2012/0163811 A1 | 6/2012 | Doany et al. |
| 2012/0194399 A1 | 8/2012 | Bily et al. |
| 2012/0242421 A1 | 9/2012 | Robin et al. |
| 2012/0256796 A1 | 10/2012 | Leiba |
| 2012/0280770 A1 | 11/2012 | Abhari et al. |
| 2013/0057358 A1 | 3/2013 | Anthony et al. |
| 2013/0082801 A1 | 4/2013 | Rofougaran et al. |
| 2013/0300602 A1 | 11/2013 | Zhou et al. |
| 2014/0015709 A1 | 1/2014 | Shijo et al. |
| 2014/0091884 A1 | 4/2014 | Flatters |
| 2014/0106684 A1 | 4/2014 | Burns et al. |
| 2014/0327491 A1 | 11/2014 | Kim et al. |
| 2015/0097633 A1 | 4/2015 | Devries et al. |
| 2015/0229017 A1 | 8/2015 | Suzuki et al. |
| 2015/0229027 A1 | 8/2015 | Sonozaki et al. |
| 2015/0263429 A1 | 9/2015 | Vahidpour et al. |
| 2015/0333726 A1 | 11/2015 | Xue et al. |
| 2015/0357698 A1 | 12/2015 | Kushta |
| 2015/0364804 A1 | 12/2015 | Tong et al. |
| 2015/0364830 A1 | 12/2015 | Tong et al. |
| 2016/0020522 A1 | 1/2016 | Sano et al. |
| 2016/0043455 A1 | 2/2016 | Seler et al. |
| 2016/0049714 A1 | 2/2016 | Ligander et al. |
| 2016/0056541 A1 | 2/2016 | Tageman et al. |
| 2016/0118705 A1 | 4/2016 | Tang et al. |
| 2016/0126637 A1* | 5/2016 | Uemichi ............ H01Q 21/0043 |
| | | 343/771 |
| 2016/0195612 A1 | 7/2016 | Shi |
| 2016/0204495 A1 | 7/2016 | Takeda et al. |
| 2016/0211582 A1 | 7/2016 | Saraf |
| 2016/0276727 A1 | 9/2016 | Dang et al. |
| 2016/0293557 A1 | 10/2016 | Topak et al. |
| 2016/0301125 A1 | 10/2016 | Kim et al. |
| 2017/0003377 A1 | 1/2017 | Menge |
| 2017/0012335 A1 | 1/2017 | Boutayeb |
| 2017/0084554 A1 | 3/2017 | Dogiamis et al. |
| 2017/0288313 A1 | 10/2017 | Chung et al. |
| 2017/0294719 A1 | 10/2017 | Tatomir |
| 2017/0324135 A1 | 11/2017 | Blech et al. |
| 2018/0013208 A1 | 1/2018 | Izadian et al. |
| 2018/0032822 A1 | 2/2018 | Frank et al. |
| 2018/0123245 A1 | 5/2018 | Toda et al. |
| 2018/0131084 A1 | 5/2018 | Park et al. |
| 2018/0212324 A1 | 7/2018 | Tatomir |
| 2018/0226709 A1 | 8/2018 | Mangaiahgari |
| 2018/0233465 A1 | 8/2018 | Spella et al. |
| 2018/0254563 A1 | 9/2018 | Sonozoki et al. |
| 2018/0284186 A1 | 10/2018 | Chadha et al. |
| 2018/0301819 A1 | 10/2018 | Kirino et al. |
| 2018/0301820 A1 | 10/2018 | Bregman et al. |
| 2018/0343711 A1 | 11/2018 | Wixforth et al. |
| 2018/0351261 A1* | 12/2018 | Kamo .................. H01Q 21/064 |
| 2018/0375185 A1 | 12/2018 | Kirino et al. |
| 2019/0006743 A1 | 1/2019 | Kirino et al. |
| 2019/0013563 A1 | 1/2019 | Takeda et al. |
| 2019/0057945 A1 | 2/2019 | Maaskant et al. |
| 2019/0109361 A1 | 4/2019 | Ichinose et al. |
| 2019/0115644 A1 | 4/2019 | Wang et al. |
| 2019/0187247 A1 | 6/2019 | Izadian et al. |
| 2019/0245276 A1 | 8/2019 | Li et al. |
| 2019/0252778 A1 | 8/2019 | Duan |
| 2019/0260137 A1 | 8/2019 | Watanabe et al. |
| 2019/0324134 A1 | 10/2019 | Cattle |
| 2019/0379132 A1* | 12/2019 | Pelletti ................. H01Q 9/0457 |
| 2020/0021001 A1 | 1/2020 | Mangaiahgari |
| 2020/0044360 A1 | 2/2020 | Kamo et al. |
| 2020/0059002 A1 | 2/2020 | Renard et al. |
| 2020/0064483 A1 | 2/2020 | Li et al. |
| 2020/0076086 A1 | 3/2020 | Cheng et al. |
| 2020/0106171 A1* | 4/2020 | Shepeleva ............ H01Q 9/0485 |
| 2020/0112077 A1 | 4/2020 | Kamo et al. |
| 2020/0166637 A1 | 5/2020 | Hess et al. |
| 2020/0203849 A1 | 6/2020 | Lim et al. |
| 2020/0212594 A1 | 7/2020 | Kirino et al. |
| 2020/0235453 A1 | 7/2020 | Lang |
| 2020/0284907 A1 | 9/2020 | Gupta et al. |
| 2020/0287293 A1 | 9/2020 | Shi et al. |
| 2020/0319293 A1 | 10/2020 | Kuriyama et al. |
| 2020/0343612 A1 | 10/2020 | Shi |
| 2020/0346581 A1 | 11/2020 | Lawson et al. |
| 2020/0373678 A1 | 11/2020 | Park et al. |
| 2021/0028528 A1 | 1/2021 | Alexanian et al. |
| 2021/0028549 A1 | 1/2021 | Doyle et al. |
| 2021/0036393 A1 | 2/2021 | Mangaiahgari |
| 2021/0104818 A1 | 4/2021 | Li et al. |
| 2021/0110217 A1 | 4/2021 | Gunel |
| 2021/0159577 A1 | 5/2021 | Carlred et al. |
| 2021/0210865 A1 | 7/2021 | Li et al. |
| 2021/0218154 A1 | 7/2021 | Shi et al. |
| 2021/0242581 A1 | 8/2021 | Rossiter et al. |
| 2021/0249777 A1 | 8/2021 | Alexanian et al. |

(56) References Cited

U.S. PATENT DOCUMENTS

| 2021/0249784 A1 | 8/2021 | Alexanian et al. |
| 2021/0305667 A1 | 9/2021 | Bencivenni |
| 2022/0094071 A1 | 3/2022 | Doyle et al. |
| 2022/0109246 A1 | 4/2022 | Emanuelsson et al. |
| 2022/0196794 A1 | 6/2022 | Foroozesh et al. |
| 2024/0120662 A1 | 4/2024 | Lee et al. |

FOREIGN PATENT DOCUMENTS

| CN | 1620738 A | 5/2005 |
| CN | 2796131 | 7/2006 |
| CN | 101584080 A | 11/2009 |
| CN | 201383535 | 1/2010 |
| CN | 201868568 U | 6/2011 |
| CN | 102157787 A | 8/2011 |
| CN | 102420352 A | 4/2012 |
| CN | 103326125 A | 9/2013 |
| CN | 203277633 U | 11/2013 |
| CN | 103490168 A | 1/2014 |
| CN | 103515682 A | 1/2014 |
| CN | 102142593 B | 6/2014 |
| CN | 104101867 A | 10/2014 |
| CN | 104900956 A | 9/2015 |
| CN | 104993254 A | 10/2015 |
| CN | 105071019 A | 11/2015 |
| CN | 105609909 A | 5/2016 |
| CN | 105680133 A | 6/2016 |
| CN | 105958167 A | 9/2016 |
| CN | 107317075 A | 11/2017 |
| CN | 108258392 A | 7/2018 |
| CN | 109286081 A | 1/2019 |
| CN | 109643856 A | 4/2019 |
| CN | 109980361 A | 7/2019 |
| CN | 110085990 A | 8/2019 |
| CN | 209389219 U | 9/2019 |
| CN | 110401022 A | 11/2019 |
| CN | 111123210 A | 5/2020 |
| CN | 111480090 A | 7/2020 |
| CN | 108376821 B | 10/2020 |
| CN | 110474137 B | 11/2020 |
| CN | 109326863 B | 12/2020 |
| CN | 112241007 A | 1/2021 |
| CN | 212604823 U | 2/2021 |
| CN | 112986951 A | 6/2021 |
| CN | 112290182 B | 7/2021 |
| CN | 113193323 B | 10/2021 |
| CN | 214706247 U | 11/2021 |
| DE | 112017006415 | 9/2019 |
| DE | 102019200893 A1 | 7/2020 |
| EP | 0174579 | 3/1986 |
| EP | 0174579 A2 | 3/1986 |
| EP | 0818058 A1 | 1/1998 |
| EP | 2267841 A1 | 12/2010 |
| EP | 2500978 A1 | 9/2012 |
| EP | 2843758 A1 | 3/2015 |
| EP | 2766224 B1 | 12/2018 |
| EP | 3460903 A1 | 3/2019 |
| EP | 3785995 A1 | 3/2021 |
| EP | 3862773 A1 | 8/2021 |
| EP | 4089840 A1 | 11/2022 |
| GB | 893008 A | 4/1962 |
| GB | 2463711 A | 3/2010 |
| GB | 2489950 A | 10/2012 |
| JP | 2000183222 A | 6/2000 |
| JP | 2003198242 A | 7/2003 |
| JP | 2003289201 A | 10/2003 |
| JP | 5269902 B2 | 8/2013 |
| JP | 2013187752 A * | 9/2013 |
| JP | 2015216533 A | 12/2015 |
| JP | 2018067888 A * | 4/2018 |
| JP | 6686820 B2 * | 4/2020 |
| KR | 20080044752 A | 5/2008 |
| KR | 1020080044752 A | 5/2008 |
| KR | 100846872 B1 | 7/2008 |
| KR | 20080105396 A | 12/2008 |
| KR | 101092846 B1 | 12/2011 |
| KR | 102154338 B1 | 9/2020 |
| WO | 9934477 A1 | 7/1999 |
| WO | 2013189513 A1 | 12/2013 |
| WO | 2018003932 A1 | 1/2018 |
| WO | 2018052335 A1 | 3/2018 |
| WO | 2019085368 A1 | 5/2019 |
| WO | 2020082363 A1 | 4/2020 |
| WO | 2021072380 A1 | 4/2021 |
| WO | 2022122319 A1 | 6/2022 |
| WO | 2022225804 A1 | 10/2022 |

OTHER PUBLICATIONS

Yu, et al., "Optimization and Implementation of SIW Slot Array for Both Medium- and Long-Range 77 GHz Automotive Radar Application", IEEE Transactions on Antennas and Propagation, vol. 66, No. 7, Jul. 2018, pp. 3769-3774.
Yuasa, et al., "A millimeter wave wideband differential line to waveguide transition using short ended slot line", Oct. 2014, pp. 1004-1007.
"Foreign Office Action", CN Application No. 202111550448.7, Jun. 17, 2023, 19 pages.
"Foreign Office Action", CN Application No. 202111551711.4, Jun. 17, 2023, 29 pages.
"Foreign Office Action", CN Application No. 202111551878.0, Jun. 15, 2023, 20 pages.
"Foreign Office Action", CN Application No. 202111563233.9, May 31, 2023, 15 pages.
"Foreign Office Action", CN Application No. 202111652507.1, Jun. 26, 2023, 14 pages.
"Foreign Office Action", CN Application No. 202210251362.2, Jun. 28, 2023, 15 pages.
Ghassemi, et al., "Millimeter-Wave Integrated Pyramidal Horn Antenna Made of Multilayer Printed Circuit Board (PCB) Process", IEEE Transactions on Antennas and Propagation, vol. 60, No. 9, Sep. 2012, pp. 4432-4435.
Hausman, et al., "Termination Insensitive Mixers", 2011 IEEE International Conference on Microwaves, Communications, Antennas and Electronic Systems (COMCAS 2011), Dec. 19, 2011, 13 pages.
"Extended European Search Report", EP Application No. 18153137.7, Jun. 15, 2018, 8 pages.
"Extended European Search Report", EP Application No. 20155296.5, Jul. 13, 2020, 12 pages.
"Extended European Search Report", EP Application No. 20166797, Sep. 16, 2020, 11 pages.
"Extended European Search Report", EP Application No. 21211165.2, May 13, 2022, 12 pages.
"Extended European Search Report", EP Application No. 21211167.8, May 19, 2022, 10 pages.
"Extended European Search Report", EP Application No. 21211168.6, May 13, 2022, 11 pages.
"Extended European Search Report", EP Application No. 21211452.4, May 16, 2022, 10 pages.
"Extended European Search Report", EP Application No. 21211474.8, Apr. 20, 2022, 14 pages.
"Extended European Search Report", EP Application No. 21211478.9, May 19, 2022, 10 pages.
"Extended European Search Report", EP Application No. 21212703.9, May 3, 2022, 13 pages.
"Extended European Search Report", EP Application No. 21215901.6, Jun. 9, 2022, 8 pages.
"Extended European Search Report", EP Application No. 21216319.0, Jun. 10, 2022, 12 pages.
"Extended European Search Report", EP Application No. 22160898.7, Aug. 4, 2022, 11 pages.
"Extended European Search Report", EP Application No. 22166998.9, Sep. 9, 2022, 12 pages.
"Extended European Search Report", EP Application No. 22183888.1, Dec. 20, 2022, 10 pages.
"Extended European Search Report", EP Application No. 22183892.3, Dec. 2, 2022, 8 pages.

(56)            References Cited

OTHER PUBLICATIONS

"Extended European Search Report", EP Application No. 22184924. 3, Dec. 2, 2022, 13 pages.
"Foreign Office Action", CN Application No. 201810122408.4, Jun. 2, 2021, 15 pages.
"Foreign Office Action", CN Application No. 201810122408.4, Oct. 18, 2021, 19 pages.
"Foreign Office Action", CN Application No. 202010146513.9, Feb. 7, 2022, 14 pages.
"WR-90 Waveguides", Pasternack Enterprises, Inc., 2016, Retrieved from https://web.archive.org/web/20160308205114/http://www. pasternack.com:80/wr-90-waveguides-category.aspx, 2 pages.
Adams, et al., "Dual Band Frequency Scanned, Height Finder Antenna", 1991 21st European Microwave Conference, 1991, 6 pages.
Alhuwaimel, et al., "Performance Enhancement of a Slotted Waveguide Antenna by Utilizing Parasitic Elements", Sep. 7, 2015, pp. 1303-1306.
Bauer, et al., "A wideband transition from substrate integrated waveguide to differential microstrip lines in multilayer substrates", Sep. 2010, pp. 811-813.
Chaloun, et al., "A Wideband 122 GHz Cavity-Backed Dipole Antenna for Millimeter-Wave Radar Altimetry", 2020 14th European Conference on Antennas and Propagation (EUCAP), Mar. 15, 2020, 4 pages.
Deutschmann, et al., "A Full W-Band Waveguide-to-Differential Microstrip Transition", Jun. 2019, pp. 335-338.
Furtula, et al., "Waveguide Bandpass Filters for Millimeter-Wave Radiometers", Journal of Infrared, Millimeter and Terahertz Waves, 2013, 9 pages.
Giese, et al., "Compact Wideband Single-ended and Differential Microstrip-to-waveguide Transitions at W-band", Jul. 2015, 4 pages.
Gray, et al., "Carbon Fibre Reinforced Plastic Slotted Waveguide Antenna", Proceedings of Asia-Pacific Microwave Conference 2010, pp. 307-310.
Hansen, et al., "D-Band FMCW Radar Sensor for Industrial Wideband Applications with Fully-Differential MMIC-to-RWG Interface in SIW", 2021 IEEE/MTT-S International Microwave Symposium, Jun. 7, 2021, pp. 815-818.
Hasan, et al., "F-Band Differential Microstrip Patch Antenna Array and Waveguide to Differential Microstrip Line Transition for FMCW Radar Sensor", IEEE Sensors Journal, vol. 19, No. 15, Aug. 1, 2019, pp. 6486-6496.
Hausman, "Termination Insensitive Mixers", 2011 IEEE International Conference on Microwaves, Communications, Antennas and Electronic Systems (COMCAS 2011), Nov. 7, 2011, 13 pages.
Huang, et al., "The Rectangular Waveguide Board Wall Slot Array Antenna Integrated with One Dimensional Subwavelength Periodic Corrugated Grooves and Artificially Soft Surface Structure", Dec. 20, 2008, 10 pages.
Jankovic, et al., "Stepped Bend Substrate Integrated Waveguide to Rectangular Waveguide Transitions", Jun. 2016, 2 pages.
Li, et al., "Millimetre-wave slotted array antenna based on double-layer substrate integrated waveguide", Jun. 1, 2015, pp. 882-888.
Lin, et al., "A THz Waveguide Bandpass Filter Design Using an Artificial Neural Network", Micromachines 13(6), May 2022, 11 pages.
Mak, et al., "A Magnetoelectric Dipole Leaky-Wave Antenna for Millimeter-Wave Application", Dec. 12, 2017, pp. 6395-6402.
Mallahzadeh, et al., "A Low Cross-Polarization Slotted Ridged SIW Array Antenna Design With Mutual Coupling Considerations", Jul. 17, 2015, pp. 4324-4333.

Ogiwara, et al., "2-D MoM Analysis of the Choke Structure for Isolation Improvement between Two Waveguide Slot Array Antennas", Proceedings of Asia-Pacific Microwave Conference 2007, 4 pages.
Razmhosseini, et al., "Parasitic Slot Elements for Bandwidth Enhancement of Slotted Waveguide Antennas", 2019 IEEE 90th Vehicular Technology Conference, Sep. 2019, 5 pages.
Rossello, et al., "Substrate Integrated Waveguide Aperture Coupled Patch Antenna Array for 24 GHz Wireless Backhaul and Radar Applications", Nov. 16, 2014, 2 pages.
Schneider, et al., "A Low-Loss W-Band Frequency-Scanning Antenna for Wideband Multichannel Radar Applications", IEEE Antennas and Wireless Propagation Letters, vol. 18, No. 4, Apr. 2019, pp. 806-810.
Serrano, et al., "Lowpass Filter Design for Space Applications in Waveguide Technology Using Alternative Topologies", Jan. 2013, 117 pages.
Shehab, et al., "Substrate-Integrated-Waveguide Power Dividers", Oct. 15, 2019, pp. 27-38.
Tong, et al., "A Wide Band Transition from Waveguide to Differential Microstrip Lines", Dec. 2008, 5 pages.
Wang, et al., "A 79-GHz LTCC differential microstrip line to laminated waveguide transition using high permittivity material", Dec. 2010, pp. 1593-1596.
Wang, et al., "Low-loss frequency scanning planar array with hybrid feeding structure for low-altitude detection radar", Sep. 13, 2019, pp. 6708-6711.
Wang, et al., "Mechanical and Dielectric Strength of Laminated Epoxy Dielectric Graded Materials", Mar. 2020, 15 pages.
Wu, et al., "A Planar W-Band Large-Scale High-Gain Substrate-Integrated Waveguide Slot Array", Feb. 3, 2020, pp. 6429-6434.
Wu, et al., "The Substrate Integrated Circuits—A New Concept for High-Frequency Electronics and Optoelectronics", Dec. 2003, 8 pages.
Non-Final Office Action, U.S. Appl. No. 16/583,867, Feb. 18, 2020, 8 pages.
Non-Final Office Action, U.S. Appl. No. 15/427,769, Nov. 13, 2018, 8 pages.
Notice of Allowance, U.S. Appl. No. 15/427,769, Jun. 28, 2019, 9 pages.
Notice of Allowance, U.S. Appl. No. 16/583,867, Jul. 8, 2020, 8 Pages.
"Non-Final Office Action", U.S. Appl. No. 16/829,409, Oct. 14, 2021, 13 pages.
"Non-Final Office Action", U.S. Appl. No. 17/061,675, Dec. 20, 2021, 4 pages.
Aulia Dewantari et al., "Flared SIW antenna design and transceiving experiments for W-band SAR," International Journal of RF and Microwave Computer-Aided Engineering, Wiley Interscience, Hoboken, USA, vol. 28, No. 9, May 9, 2018, XP072009558.
Foreign Office Action, CN Application No. 202111550163.3, Jun. 17, 2023, 25 pages.
Extended European Search Report, EP Application No. 23158037.4, Aug. 17, 2023, 9 pages.
Extended European Search Report, EP Application No. 23158947.4, Aug. 17, 2023, 11 pages.
Communication pursuant to Article 94(3) EPC issued Oct. 23, 2024 in European Application No. 21211167.8.
Mak Ka-Ming et al., "A Magnetoelectric Dipole Leaky-Wave Antenna for Milimeter-Wave Application," IEEE Trans on Antenn and Propag, vol. 65, No. 12, Dec. 2017.
Non-Final Office Action issued Dec. 12, 2024 in U.S. Appl. No. 18/406,536.

* cited by examiner

600

602

Parasitic Patch
Element
506

Waveguide
604

Radiation Slot
114

Zigzag
Waveguide
Channel
606

Longitudinal
Direction
208

602

Parasitic Patch
Element
506

First Layer
508

Second Layer
510

Third Layer
512

Fourth Layer
608

Zigzag Waveguide
Channel
606

Radiation Slot
114

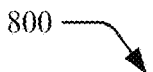

800

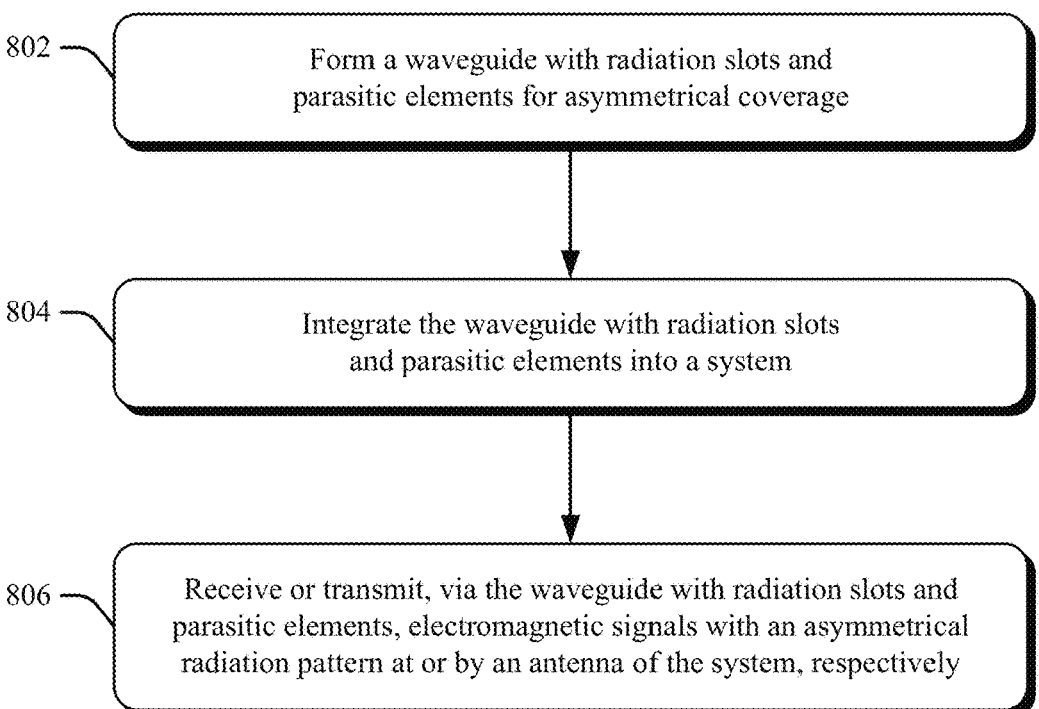

802 —  Form a waveguide with radiation slots and
parasitic elements for asymmetrical coverage 804 —  Integrate the waveguide with radiation slots
and parasitic elements into a system 806 —  Receive or transmit, via the waveguide with radiation slots and
parasitic elements, electromagnetic signals with an asymmetrical
radiation pattern at or by an antenna of the system, respectively

*FIG. 8*

WAVEGUIDE WITH RADIATION SLOTS AND PARASITIC ELEMENTS FOR ASYMMETRICAL COVERAGE

CROSS-REFERENCE TO RELATED APPLICATIONS

This application is a continuation of U.S. patent application Ser. No. 17/234,424, filed Apr. 19, 2021, which claims the benefit under 35 U. S.C. 119(e) of U.S. Provisional Application No. 63/169,111, filed Mar. 31, 2021, and U.S. Provisional Application Nos. 63/127,819, 63/127,861, and 63/127,873, each filed Dec. 18, 2020, the disclosures of which are hereby incorporated by reference in their entirety herein.

BACKGROUND

Some devices (e.g., radar systems) use electromagnetic signals to detect and track objects. The electromagnetic signals are transmitted and received using one or more antennas. The radiation pattern of an antenna may be characterized by gain or beam width, which indicates gain as a function of direction. Precisely controlling the radiation pattern can improve the application of a radar system. For example, many automotive applications require radar systems that provide an asymmetrical beam width to detect objects within a particular field-of-view (e.g., in a particular portion of a travel path of the vehicle). A waveguide may be used to improve and control the radiation pattern of such devices. Such a waveguide can include perforations or radiation slots to guide radiation near the antenna. These waveguides, however, can generate a uniform beam width that focuses on multiple targets equally within the fields-of-view, making them indistinguishable for tracking.

SUMMARY

This document describes techniques, apparatuses, and systems for a waveguide with radiation slots and parasitic elements for asymmetrical coverage. An apparatus may include a waveguide for providing asymmetrical coverage in an azimuth plane. The waveguide includes a hollow channel containing a dielectric and an array of radiation slots through a surface that is operably connected with the dielectric. The waveguide includes an array of parasitic bump, patch, or cavity elements positioned on or in the surface, and offset from a longitudinal side of the array of radiation slots. The radiation slots and parasitic elements configure the described waveguide to focus an antenna radiation pattern that provides an asymmetrical coverage to focus on a particular portion within the antenna field-of-view.

This document also describes methods performed by the above-summarized techniques, apparatuses, and systems, and other methods set forth herein, as well as means for performing these methods.

This Summary introduces simplified concepts related to a waveguide with radiation slots and parasitic elements for asymmetrical coverage, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a waveguide with radiation slots and parasitic elements for asymmetrical coverage are described in this document with reference to the following figures. The same numbers are often used throughout the drawings to reference like features and components:

FIG. 8 illustrates an example method for manufacturing a waveguide with radiation slots and parasitic elements for asymmetrical coverage following techniques, apparatuses, and systems of this disclosure.

DETAILED DESCRIPTION

Overview

Radar systems are a sensing technology that some automotive systems rely on to acquire information about the surrounding environment. Radar systems generally use an antenna to direct electromagnetic energy or signals being transmitted or received. Such radar systems can use multiple antenna elements in an array to provide increased gain and directivity in comparison to the radiation pattern achievable with a single antenna element. Signals from the multiple antenna elements are combined with appropriate phases and weighted amplitudes to provide the desired radiation pattern.

Consider a waveguide used to transfer electromagnetic energy to and from the antenna elements. The waveguide generally includes an array of radiation slots representing apertures in the waveguide. Manufacturers may select the number and arrangement of the radiation slots to provide the desired phasing, combining, or splitting of electromagnetic energy. For example, the radiation slots are equally spaced at a wavelength distance apart in a waveguide surface along a propagation direction of the electromagnetic energy. This arrangement of radiating slots generally provides a wide radiation pattern with relatively uniform radiation in the azimuth plane.

This document describes a waveguide with radiation slots and parasitic elements that provides an asymmetrical radiation pattern in the azimuth plane. The waveguide includes parasitic bump, patch, or cavity elements on one side of each radiation slot to generate non-uniform coverage. The parasitic elements are positioned on an outer surface of the waveguide. In some implementations, the parasitic elements have an approximately rectangular shape. The parasitic elements have an approximately circular shape, oval shape, C shape, T shape, or L shape in other implementations. The parasitic elements can be sized and positioned relative to the array of radiation slots to generate a radiation pattern with an asymmetrical radiation pattern and higher gain within the desired portion of the field-of-view.

The described waveguide may be particularly advantageous for use in an automotive context, for example, detecting objects in a roadway in a travel path of a vehicle. The asymmetrical coverage allows a radar system of the vehicle to detect objects in a particular portion of the field-of-view (e.g., immediately in front of the vehicle) but still detect objects in the remaining portion of the field-of-view (e.g., toward the side of the vehicle). As one example, a radar system placed near the front of a vehicle can use an asymmetrical radiation pattern in one plane to focus on detecting objects immediately in front of the vehicle instead of objects located toward a side of the vehicle.

This example waveguide is just one example of the described techniques, apparatuses, and systems of a waveguide with radiation slots and parasitic elements for asymmetrical coverage. This document describes other examples and implementations.

Operating Environment

Figure 1:
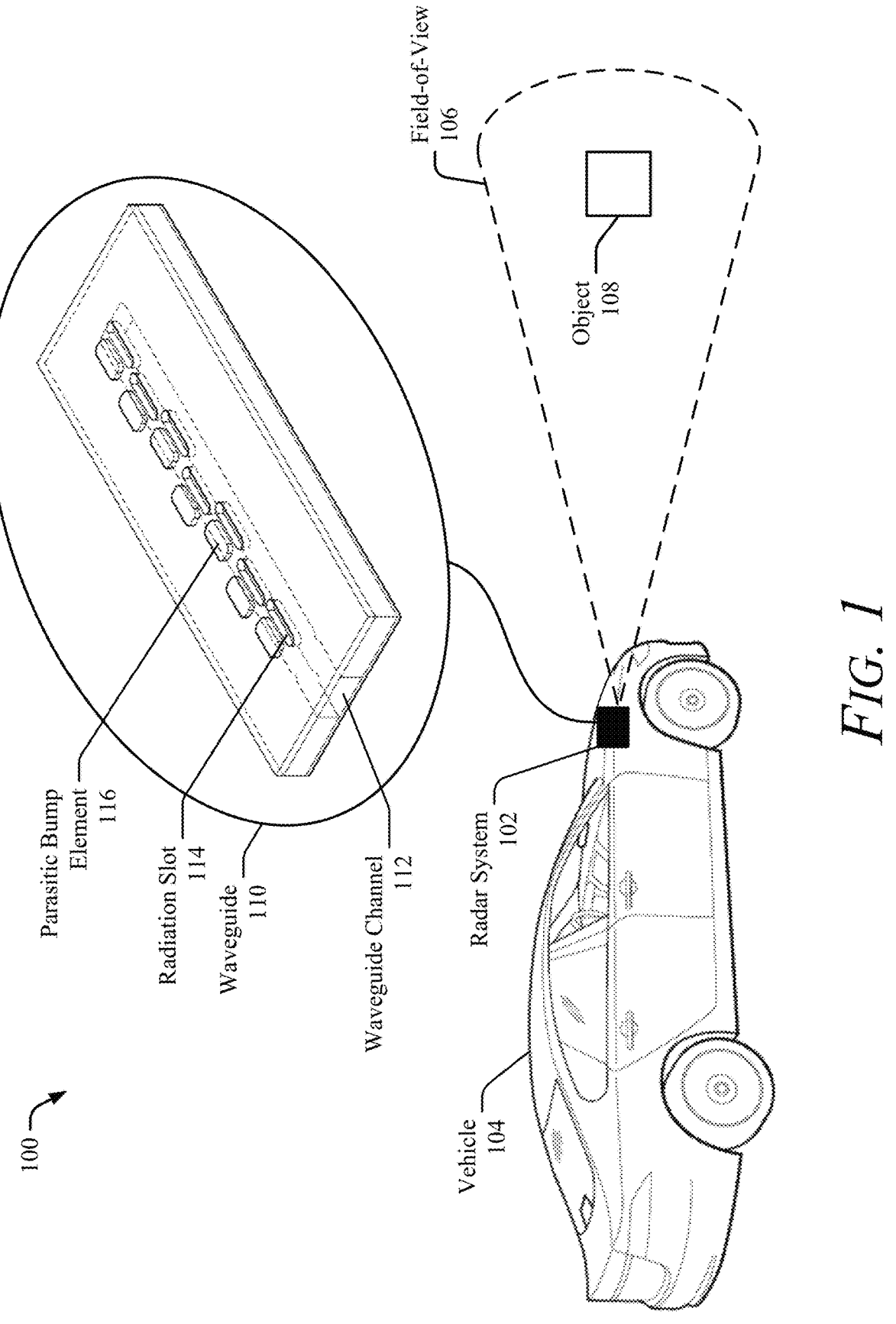
FIG. 1 illustrates an example environment in which a radar system with a waveguide with radiation slots and parasitic elements for asymmetrical coverage is used on a vehicle, in accordance with techniques, apparatuses, and systems of this disclosure.

FIG. 1 illustrates an example environment 100 in which a radar system 102 with a waveguide 110 with radiation slots and parasitic elements for asymmetrical coverage is used on a vehicle 104. The vehicle 104 may use the waveguide 110 to enable operations of the radar system 102 that is configured to determine a proximity, an angle, or a velocity of one or more objects 108 in the proximity of the vehicle 104.

Although illustrated as a car, the vehicle 104 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 102 to any moving platform, including moving machinery or robotic equipment. In other implementations, other devices (e.g., desktop computers, tablets, laptops, televisions, computing watches, smartphones, gaming systems, and so forth) may incorporate the radar system 102 with the waveguide 110 and support techniques described herein.

In the depicted environment 100, the radar system 102 is mounted near, or integrated within, a front portion of the vehicle 104 to detect the object 108 and avoid collisions. The radar system 102 provides a field-of-view 106 towards the one or more objects 108. The radar system 102 can project the field-of-view 106 from any exterior surface of the vehicle 104. For example, vehicle manufacturers can integrate the radar system 102 into a bumper, side mirror, headlights, rear lights, or any other interior or exterior location where the object 108 requires detection. In some cases, the vehicle 104 includes multiple radar systems 102, such as a first radar system 102 and a second radar system 102 that provide a larger field-of-view 106. In general, vehicle manufacturers can design the locations of the one or more radar systems 102 to provide a particular field-of-view 106 that encompasses a region of interest, including, for instance, in or around a travel lane aligned with a vehicle path.

Example fields-of-view 106 include a 360-degree field-of-view, one or more 180-degree fields-of-view, one or more 90-degree fields-of-view, and so forth, which can overlap or be combined into a field-of-view 106 of a particular size. As described above, the described waveguide 110 includes parasitic bump elements 116 to provide a radiation pattern with an asymmetrical coverage in the azimuth plane and/or the elevation plane. As one example, a radar system placed near the front corner (e.g., the front left corner) of a vehicle can use an asymmetrical radiation pattern in one plane to focus on detecting objects immediately in front of the vehicle (e.g., in the left-hand portion of a travel lane aligned with a vehicle path) instead of objects located toward a side of the vehicle (e.g., in an adjacent travel lane to the vehicle path). For example, the asymmetrical coverage or asymmetrical beam width can concentrate the radiated EM energy within 30 to 90 degrees of a direction following a travel path of the vehicle 104. In contrast, a waveguide without the described configuration of radiation slots and parasitic elements may provide a relatively uniform radiation pattern with the radiated EM energy within plus or minus approximately 90 degrees of the travel-path direction.

The object 108 is composed of one or more materials that reflect radar signals. Depending on the application, the object 108 can represent a target of interest. In some cases, the object 108 can be a moving object or a stationary object. The stationary objects can be continuous (e.g., a concrete barrier, a guard rail) or discontinuous (e.g., a traffic cone) along a road portion.

The radar system 102 emits electromagnetic radiation by transmitting one or more electromagnetic signals or waveforms via radiation slots 114 and parasitic bump elements 116. In the environment 100, the radar system 102 can detect and track the object 108 by transmitting and receiving one or more radar signals. For example, the radar system 102 can transmit electromagnetic signals between 100 and 400 gigahertz (GHz), between 4 and 100 GHz, or between approximately 70 and 80 GHz.

The radar system 102 can determine a distance to the object 108 based on the time it takes for the signals to travel from the radar system 102 to the object 108 and from the object 108 back to the radar system 102. The radar system 102 can also determine the location of the object 108 in terms of an angle based on the direction of a maximum amplitude echo signal received by the radar system 102.

The radar system 102 can be part of the vehicle 104. The vehicle 104 can also include at least one automotive system that relies on data from the radar system 102, including a driver-assistance system, an autonomous-driving system, or a semi-autonomous-driving system. The radar system 102 can include an interface to the automotive systems. The radar system 102 can output, via the interface, a signal based on electromagnetic energy received by the radar system 102.

Generally, the automotive systems use radar data provided by the radar system 102 to perform a function. For example, the driver-assistance system can provide blind-spot monitoring and generate an alert indicating a potential collision with the object 108 detected by the radar system 102. In this case, the radar data from the radar system 102 indicates when it is safe or unsafe to change lanes. The autonomous-driving system may move the vehicle 104 to a particular location on the road while avoiding collisions with the object 108 detected by the radar system 102. The radar data provided by the radar system 102 can provide information about a distance to and the location of the object 108 to enable the autonomous-driving system to perform emergency braking, perform a lane change, or adjust the speed of the vehicle 104.

The radar system 102 generally includes a transmitter (not illustrated) and at least one antenna, including the waveguide 110, to transmit electromagnetic signals. The radar system 102 generally includes a receiver (not illustrated) and at least one antenna, including the waveguide 110, to receive reflected versions of these electromagnetic signals. The transmitter includes components for emitting electromagnetic signals. The receiver includes components to detect the reflected electromagnetic signals. The transmitter and the receiver can be incorporated together on the same integrated circuit (e.g., a transceiver integrated circuit) or separately on different integrated circuits.

The radar system 102 also includes one or more processors (not illustrated) and computer-readable storage media (CRM) (not illustrated). The processor can be a microprocessor or a system-on-chip. The processor executes instructions stored within the CRM. As an example, the processor can control the operation of the transmitter. The processor can also process electromagnetic energy received by the antenna and determine the location of the object 108 relative to the radar system 102. The processor can also generate radar data for the automotive systems. For example, the processor can control, based on processed electromagnetic energy from the antenna, an autonomous or semi-autonomous driving system of the vehicle 104.

The waveguide 110 includes at least one layer that can be any solid material, including wood, carbon fiber, fiber glass, metal, plastic, or a combination thereof. The waveguide 110 can also include a printed circuit board (PCB). The waveguide 110 is designed to mechanically support and electrically connect components (e.g., a waveguide channel 112, radiation slots 114, parasitic bump elements 116) to a dielectric using conductive materials. The waveguide channel 112 includes a hollow channel to contain the dielectric (e.g., air). The radiation slots 114 provide an opening through a layer or surface of the waveguide 110. The radiation slots 114 are configured to allow electromagnetic energy to dissipate to the environment 100 from the dielectric in the waveguide channel 112. The parasitic bump elements 116 are formed on the surface of the waveguide 110 and to the side of the radiation slots 114. The parasitic bump elements 116 act as radiating elements for the electromagnetic energy dissipating through the radiation slots 114 and effectively concentrate the radiation pattern to an asymmetrical radiation pattern within the field-of-view 106.

This document describes example embodiments of the waveguide 110 to provide asymmetrical coverage in an antenna radiation pattern in greater detail with respect to FIGS. 2 through 7B. The asymmetrical coverage allows a radar system 102 of the vehicle 104 to detect objects 108 in a particular portion of the field-of-view 106 (e.g., immediately in front of the vehicle) but still detect objects 108 in the remaining portion of the field-of-view 106 (e.g., toward the side of the vehicle). As described above, a radar system 102 placed near the front of the vehicle 104 can use an asymmetrical radiation pattern in one plane (e.g., the azimuth plane) to focus on detecting objects 108 immediately in front of the vehicle 104 instead of objects located toward a side of the vehicle 104.

Figure 2:
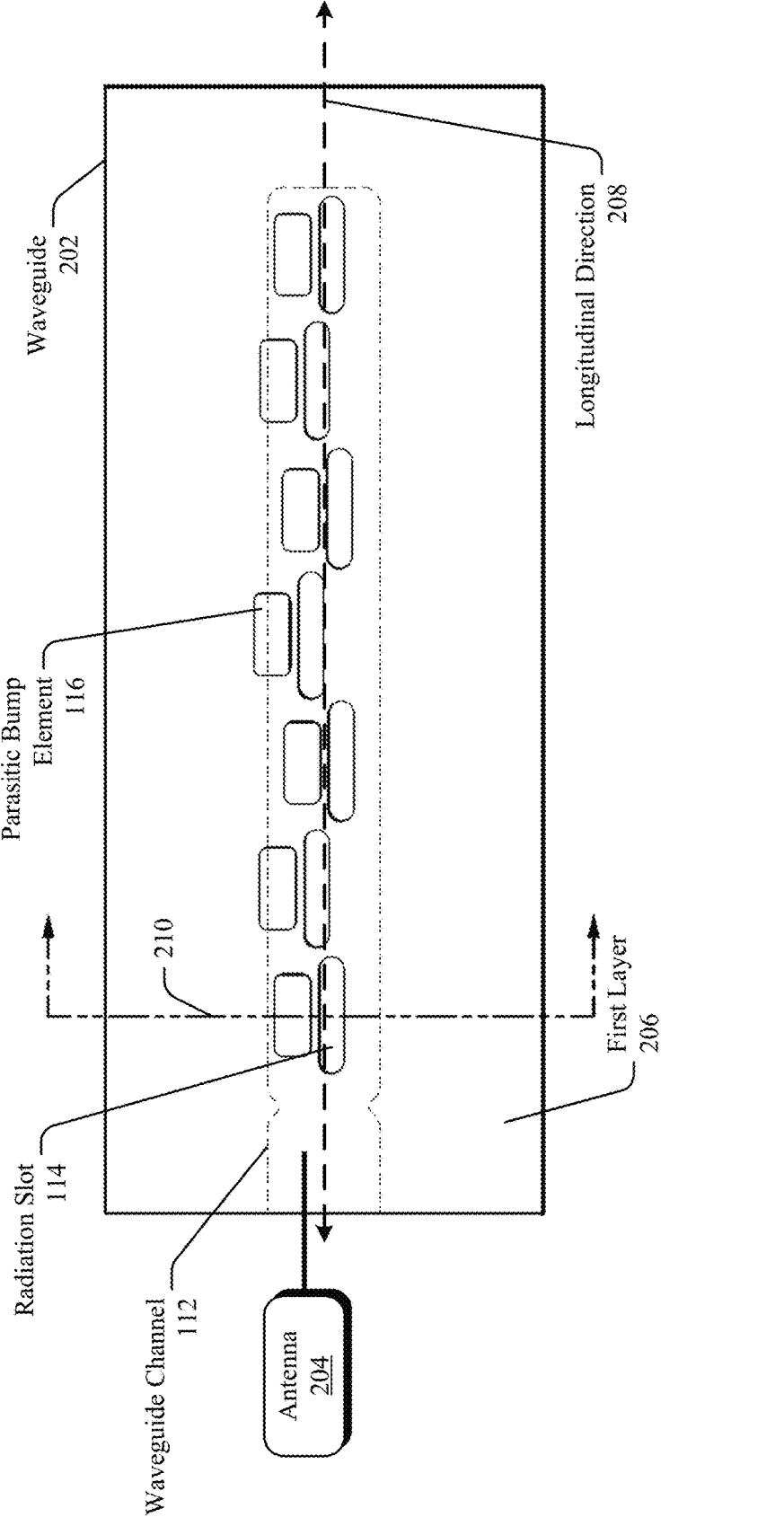
FIG. 2 illustrates a top view of a waveguide with radiation slots and parasitic bump elements for asymmetrical coverage.
Figure 3:
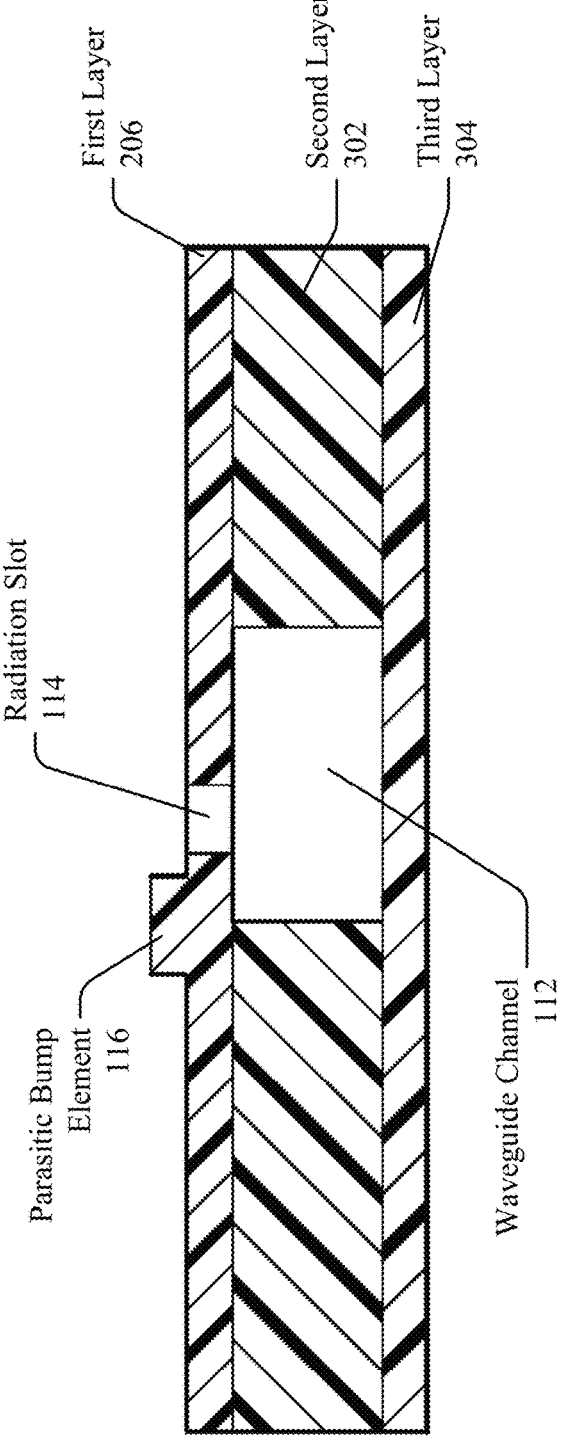
FIG. 3 illustrates a cross-section view of a waveguide with radiation slots and parasitic bump elements for asymmetrical coverage.

FIG. 2 illustrates a top view 200 of a waveguide 202 with radiation slots 114 and parasitic bump elements 116 for asymmetrical coverage. The waveguide 202 is an example of the waveguide 110 of FIG. 1. A cross-section view 210 of the waveguide 202 is illustrated in FIG. 3. The waveguide 202 includes the waveguide channel 112, multiple radiation slots 114, and multiple parasitic bump elements 116.

The waveguide channel 112 is configured to channel electromagnetic signals transmitted by the transmitter and an antenna 204. The antenna 204 can be electrically coupled to a floor of the waveguide channel 112. The floor of the waveguide channel 112 is opposite a first layer 206, on which the parasitic bump elements 116 are positioned.

The waveguide channel 112 can include a hollow channel for a dielectric. The dielectric generally includes air, and the waveguide 202 is an air waveguide. The waveguide channel 112 forms an opening in a longitudinal direction 208 at one end of the waveguide 202 and a closed wall at an opposite end. The antenna 204 is electrically coupled to the dielectric via the floor of the waveguide channel 112. Electromagnetic signals enter the waveguide channel 112 through the opening and exit the waveguide channel 112 via the radiation slots 114. In FIG. 2, the waveguide channel 112 forms an approximately rectangular shape in the longitudinal direction 208. As discussed with respect to FIGS. 6A, 6B, 7A, and 7B, the waveguide channel 112 can also form a zigzag shape in the longitudinal direction 208.

The radiation slots 114 provide an opening through the first layer 206 that defines a surface of the waveguide channel 112. For example, the radiation slots 114 can have an approximately rectangular shape (e.g., a longitudinal slot parallel to the longitudinal direction 208) as illustrated in FIG. 2. The longitudinal slots allow the radiation slots 114, in combination with the parasitic bump elements 116, to produce a horizontal-polarized radiation pattern. The radiation slots 114 can have other shapes in other implementations, including approximately circular, oval, or square.

The radiation slots 114 are sized and positioned on the first layer 206 to produce a particular radiation pattern for the antenna 204. For example, at least some of the radiation slots 114 are offset from the longitudinal direction 208 (e.g., a centerline of the waveguide channel 112) by varying or non-uniform distances (e.g., in a zigzag shape) to reduce or eliminate side lobes from the radiation pattern of the waveguide 202. As another example, the radiation slots 114 nearer the wall at the opposite end of the waveguide channel 112 can have a larger longitudinal opening than the radiation slots 114 nearer the opening of the waveguide channel 112. The specific size and position of the radiation slots 114 can be determined by building and optimizing a model of the waveguide 202 to produce the desired radiation pattern.

As illustrated in FIG. 2, the plurality of radiation slots 114 is evenly distributed along the waveguide channel 112 between the opening of the waveguide channel and the closed wall. Each adjacent pair of radiation slots 114 are separated along the longitudinal direction 208 by a uniform distance to produce a particular radiation pattern. The uniform distance, which is generally less than one wavelength of the electromagnetic radiation, can prevent grating lobes in the radiation pattern.

The parasitic bump elements 116 are formed on an outer surface of the first layer 206. The parasitic bump elements 116 have an approximately rectangular shape in the depicted implementation. The parasitic bump elements 116 can have an approximately circular shape, oval shape, C shape, T shape, or L shape in other implementations. In yet other implementations, the parasitic bump elements 116 can combine the described shapes. A parasitic bump element 116 is positioned adjacent to and offset from a longitudinal side of each radiation slot 114. The longitudinal sides of the radiation slots 114 are approximately parallel to the longitudinal direction 208. The parasitic bump elements 116 can be offset a first distance from the longitudinal side of the radiation slots 114 to generate a particular band of coverage in the radiation pattern of the antenna 204. The parasitic bump elements 116 can also have a height that is less than the depth of the radiation slots 114.

The electromagnetic radiation that leaks through the radiation slots 114 may excite the parasitic bump elements 116 to generate a radiation pattern with an asymmetrical radiation pattern in the azimuth plane. The shape and size of the parasitic bump elements 116 can be configured to vary the bandwidth and characteristics of the radiation pattern. The specific size and position of the parasitic bump elements 116 can be determined by building and optimizing a model of the waveguide 202 to produce the desired radiation pattern.

FIG. 3 illustrates the cross-section view 210 of the waveguide 202 with radiation slots 114 and parasitic bump elements 116 for asymmetrical coverage. The waveguide 202 includes the first layer 206, a second layer 302, and a third layer 304. The first layer 206, the second layer 302, and the third layer 304 can be metal or metal-plated material. The radiation slots 114 form openings in the first layer 206 into the waveguide channel 112. The parasitic bump elements 116 are formed on or as part of the first layer 206. The second layer 302 forms sides of the waveguide channel 112. The third layer 304 forms the floor of the waveguide channel 112. In the depicted implementation, the first layer 206, the second layer 302, and the third layer 304 are separate layers. In other implementations, the first layer 206, the second layer 302, and the third layer 304 can be formed as a single layer that defines the waveguide channel 112, the radiation slots 114, and the parasitic bump elements 116.

As depicted in FIG. 3, the waveguide channel 112 can form an approximately rectangular opening in the cross-section view 210 of the waveguide 202. In other implementations, the waveguide channel 112 can form an approximately square, oval, or circular opening in the cross-section view 210 of the waveguide 202.

Figure 4A:
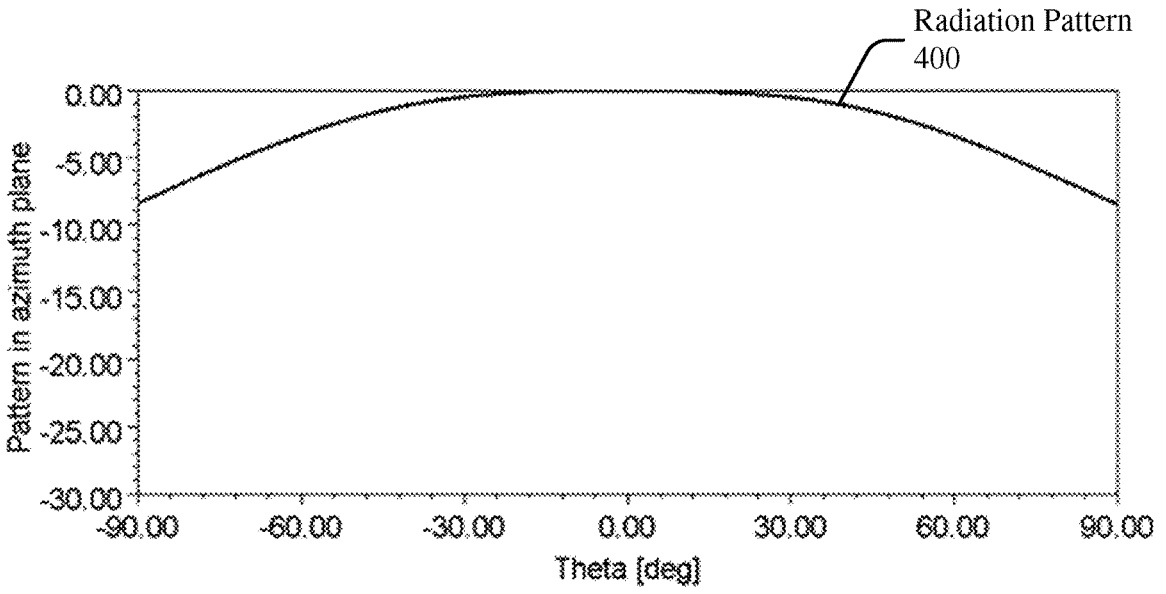
FIGS. 4A and 4B illustrate radiation patterns associated with example waveguides without and with radiation slots and parasitic elements, respectively.

FIG. 4A illustrates a radiation pattern 400 associated with an example waveguide without radiation slots and parasitic elements. The example waveguide without radiation slots and parasitic elements can generate a uniform radiation pattern 400 in an azimuth plane but with a relatively wide beam width.

Figure 4B:
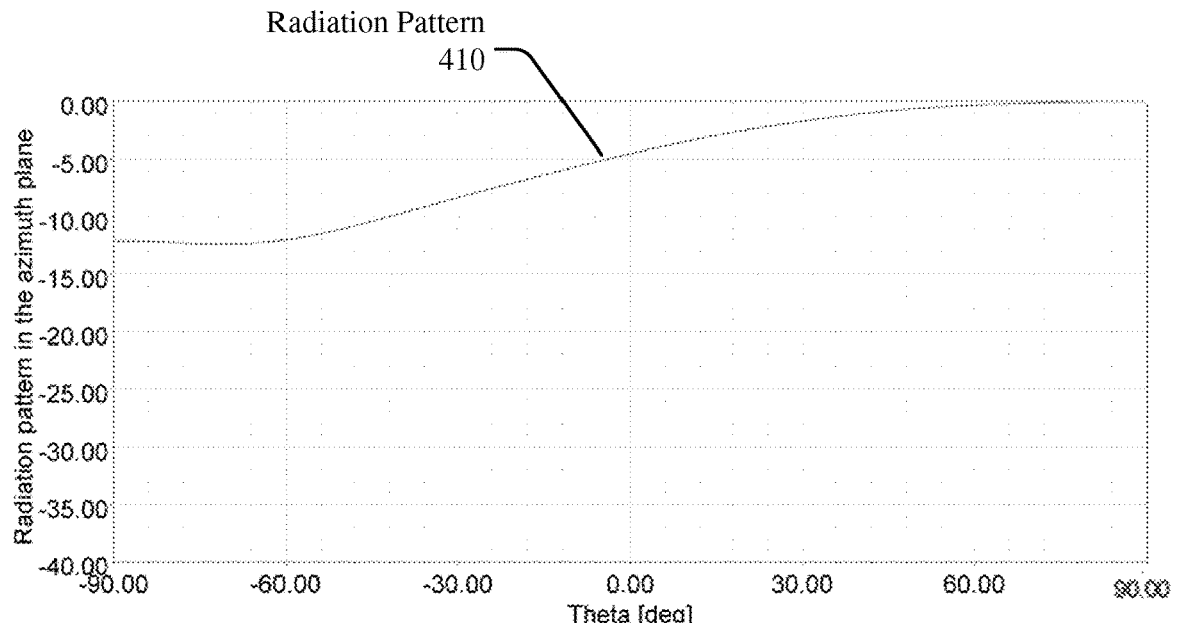

In contrast to FIG. 4A, FIG. 4B illustrates a radiation pattern 410 associated with an example waveguide with radiation slots and parasitic elements for asymmetrical coverage. The radiation pattern 410 generates an asymmetrical radiation pattern, also in the azimuth plane, with the energy focused on a particular portion of the antenna radiation pattern. The example waveguide can include the waveguide 202 illustrated in FIGS. 2 and 3 with the radiation slots 114 and the parasitic bump elements 116. The waveguide 202 can generate the asymmetrical radiation pattern 410 in the azimuth plane to enable a radar system to focus the radiation pattern of a corresponding antenna on a portion of the field-of-view where potential objects-of-interest are more likely to be located than the radar system can using the radiation pattern 400 illustrated in FIG. 4A. As one example, a radar system placed near the front of a vehicle can use an asymmetrical radiation pattern in one plane to focus on detecting objects immediately in front of the vehicle instead of objects located toward a side of the vehicle.

Figure 5A:
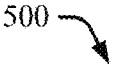
FIGS. 5A and 5B illustrate views of another waveguide with radiation slots and parasitic patch elements for asymmetrical coverage.
Figure 5A:
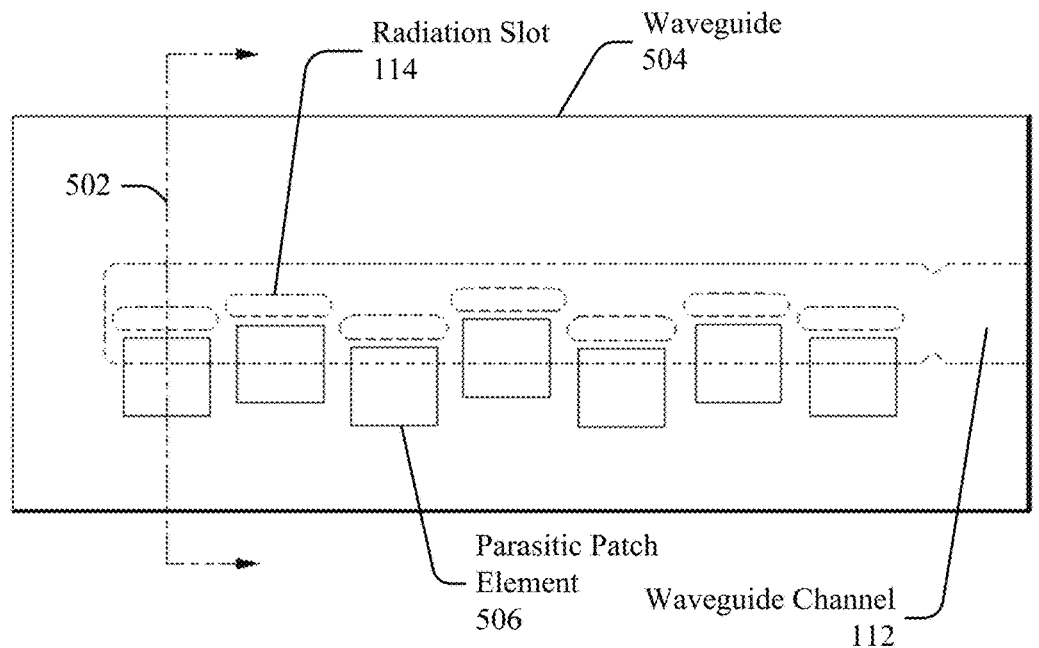
Figure 5B:
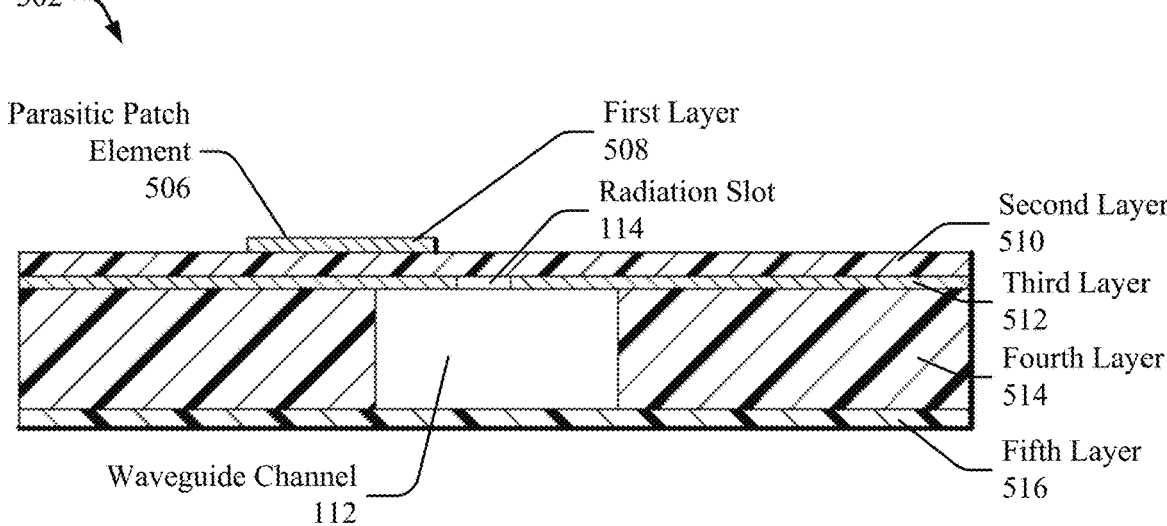

FIG. 5A illustrates a top view 500 of a waveguide 504 with radiation slots and parasitic patch elements 116 for asymmetrical coverage. FIG. 5B illustrates a cross-section view 502 of the waveguide 504 for asymmetrical coverage. The waveguide 504 includes the waveguide channel 112, the radiation slots 114, and the parasitic patch elements 506.

The waveguide 504 includes a first layer 508, a second layer 510, a third layer 512, a fourth layer 514, and a fifth layer 516. The first layer 508, the second layer 510, and the third layer 512 provide a top conductive layer, a substrate layer, and a bottom conductive layer, respectively, of a printed circuit board (PCB). The first layer 508 and the third layer 512 can include various conductive materials, including tin-lead, silver, gold, copper, and so forth, to enable the transport of electromagnetic energy. Like the second layer 302 and the third layer 304 illustrated in FIG. 3, the fourth layer 514 and the fifth layer 516 form sides and the floor, respectively, of the waveguide channel 112. The fourth layer 514 and the fifth layer 516 are separate layers in the depicted implementation. In other implementations, the fourth layer 514 and the fifth layer 516 can be formed as a single layer and combined with the PCB structure to form the waveguide channel 112.

The use of the PCB structure for the waveguide 504 provides several advantages over the structure of the waveguide 202 illustrated in FIGS. 2 and 3. For example, using a PCB allows manufacturing of the waveguide 504 to be cheaper, less complicated, and easier for mass production. As another example, using a PCB provides low loss of electromagnetic radiation from the input of the waveguide channel 112 to radiation from the radiation slots 114 and the parasitic patch elements 506.

The first layer 508 can be etched to form the parasitic patch elements 506 as part of the top conductive layer of the PCB. The third layer 512 can be etched to form the radiation slots 114 as part of the bottom conductive layer of the PCB.

Figure 6A:
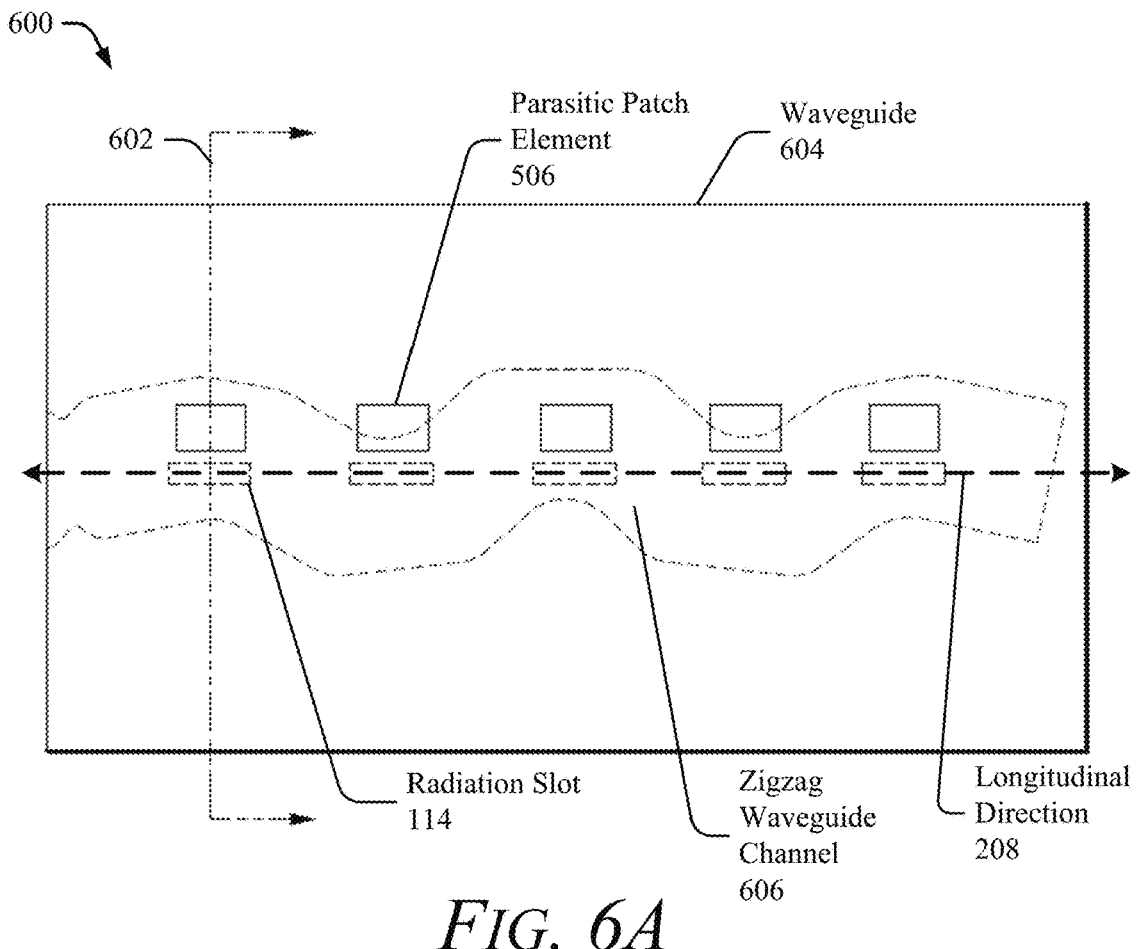
FIGS. 6A and 6B illustrate views of a waveguide with radiation slots and parasitic patch elements for asymmetrical coverage and a zigzag waveguide channel.
Figure 6B:
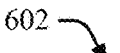
Figure 6B:
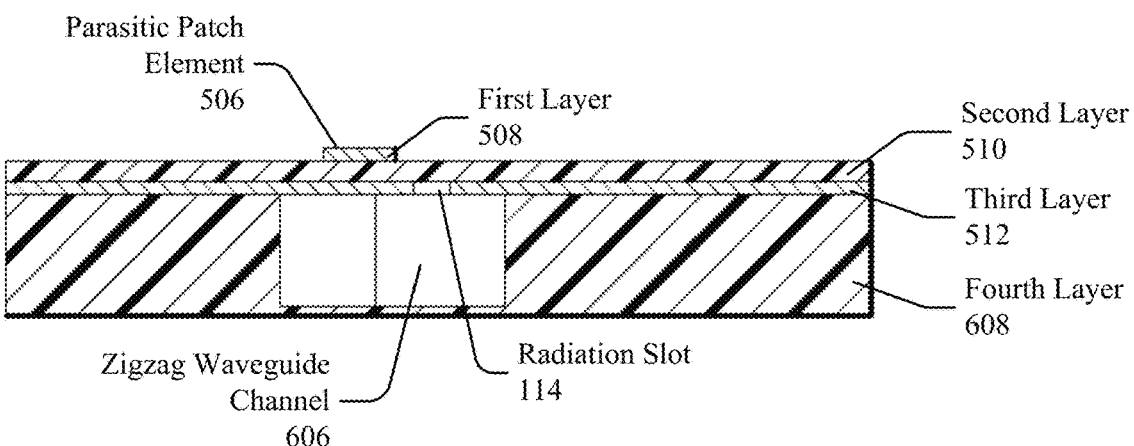

FIG. 6A illustrates a top view 600 of a waveguide 604 with the radiation slots 114 and the parasitic patch elements 506 for asymmetrical coverage and a zigzag waveguide channel 606. FIG. 6B illustrates a cross-section view 602 of the waveguide 604. The waveguide 604 includes the radiation slots 114 and the parasitic patch elements 506, similar to those illustrated for the waveguide 504 of FIGS. 5A and 5B. The waveguide 604 also includes the first layer 508, the second layer 510, the third layer 512, and a fourth layer 608. Like the waveguide 504, the first layer 508, the second layer 510, and the third layer 512 of the waveguide 604 provide a top conductive layer, a substrate layer, and a bottom conductive layer, respectively, of a printed circuit board (PCB). The fourth layer 608 is a combination of the fourth layer 514 and the fifth layer 516 for the waveguide 504 in FIGS. 5A and 5B. As described above, the fourth layer 608 is formed as a single layer and combined with the PCB structure to form the waveguide channel 112.

As illustrated in FIG. 6A, the zigzag waveguide channel 606 forms a zigzag shape in the longitudinal direction 208. The zigzag shape of the zigzag waveguide channel 606 can reduce or eliminate grating lobes in the radiation pattern that a straight or rectangular waveguide shape can introduce (e.g., the waveguide channel 112). The turns in the zigzag shape can include various turning angles between 0 and 90 degrees to provide the zigzag shape in the longitudinal direction 208.

As depicted in FIG. 6B, the zigzag waveguide channel 606 forms an approximately rectangular opening in the cross-section view 602 of the waveguide 604. In other implementations, the zigzag waveguide channel 606 can form an approximately square, oval, or circular opening in the cross-section view 602.

The plurality of radiation slots 114 is evenly distributed along the zigzag waveguide channel 606 between the opening of the waveguide channel and the closed wall. Each adjacent pair of radiation slots 114 are separated along the longitudinal direction 208 by a uniform distance to produce a particular radiation pattern. The zigzag shape of the zigzag waveguide channel 606 allows manufacturers to position the radiation slots 114 in an approximately straight line along the longitudinal direction 208.

As depicted in FIG. 6A, the parasitic patch elements 506 include an array of parasitic patch elements 506 positioned on a longitudinal side of the radiation slots 114. In other implementations, the parasitic patch element 506 can include a single parasitic patch element 506 positioned on a longitudinal side of the radiation slots 114. In other words, the parasitic patch elements 506 can include an approximately rectangular element that extends lengthwise in the longitudinal direction from the radiation slot 114 nearest to the opening of the zigzag waveguide channel 606 to the radiation slot 114 nearest the closed end of the zigzag waveguide channel 606.

Figure 7A:
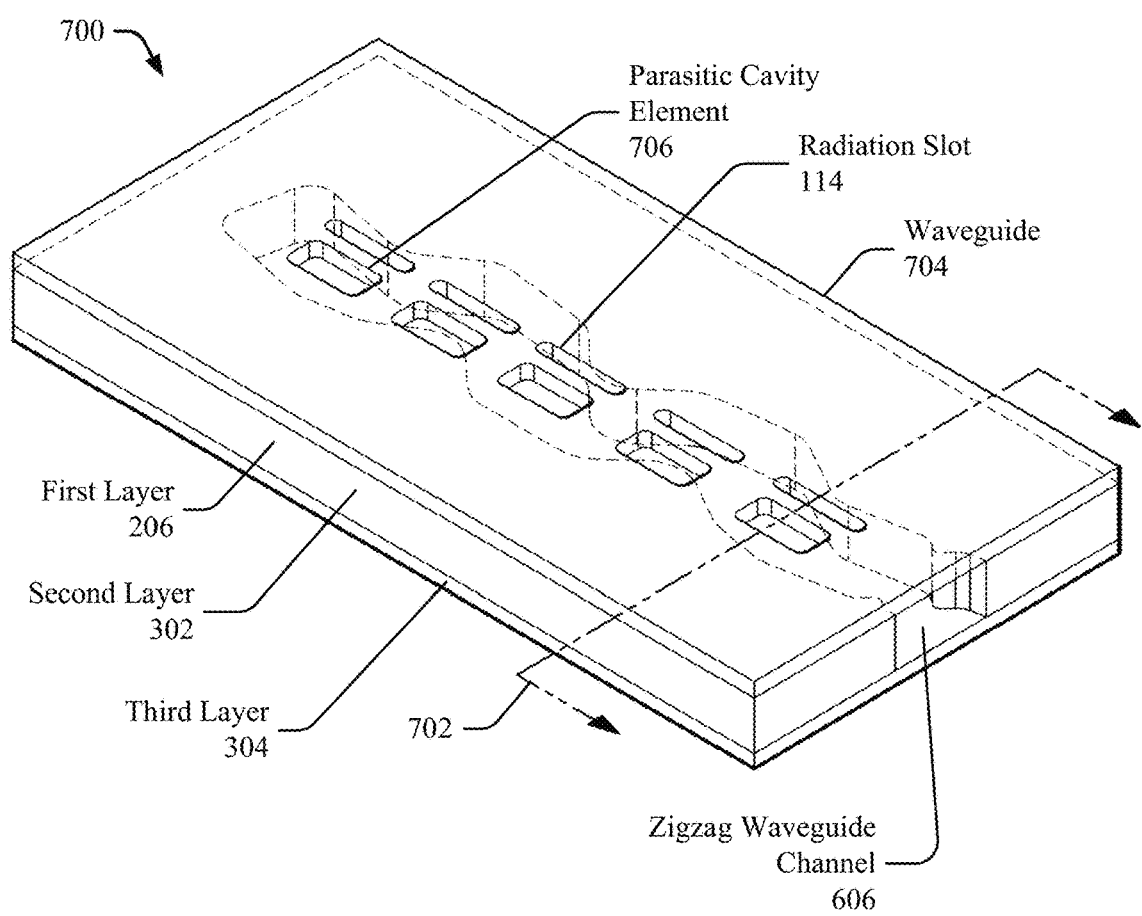
FIGS. 7A and 7B illustrate views of a waveguide with another example of radiation slots and parasitic cavity elements for asymmetrical coverage.
Figure 7B:
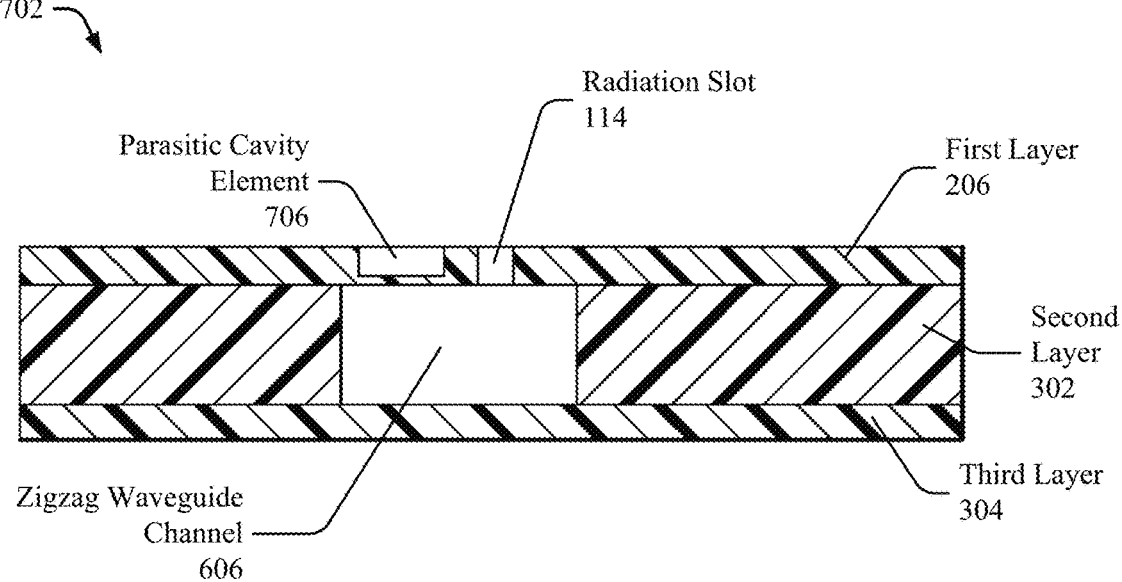

FIG. 7A illustrates a perspective view 700 of a waveguide 704 with another example of radiation slots 114 with parasitic cavity elements 706 for asymmetrical coverage. The waveguide 704 includes the zigzag waveguide channel 606. FIG. 7B illustrates a cross-section view 702 of the waveguide 704.

The waveguide 704 includes the radiation slots 114, the first layer 206, the second layer 302, and the third layer 304, similar to those illustrated for the waveguide 202 in FIGS. 1 through 3. In other implementations, the waveguide 704 can include the first layer 508, the second layer 510, the third layer 512, the fourth layer 514, and the fifth layer 516, similar to those illustrated for the waveguide 504 in FIGS. 5A and 5B.

The waveguide 704 also includes the zigzag waveguide channel 606, similar to that illustrated for the waveguide 604 in FIGS. 6A and 6B. In other implementations, the waveguide 704 can include an approximately rectangular waveguide channel similar to the waveguide channel 112 illustrated for the waveguide 202 of FIG. 2.

The parasitic cavity elements 706 are formed as recesses or cavities in the first layer 206. In the depicted implementation, the cavity of the parasitic cavity elements 706 has an approximately rectangular shape. The parasitic cavity elements 706 can have an approximately circular shape, oval shape, C shape, T shape, or L shape in other implementations. In yet other implementations, the parasitic cavity elements 706 can combine the described shapes. Like the parasitic bump element 116 of FIG. 2, a parasitic cavity element 706 is positioned adjacent to and offset from the longitudinal side of each radiation slot 114.

As depicted in FIG. 7A, the parasitic cavity elements 706 include an array of cavities positioned on the longitudinal side of the radiation slots 114. In other implementations, the parasitic cavity elements 706 can include a single parasitic cavity element 706 positioned on the longitudinal side of the radiation slots 114. In other words, the parasitic cavity elements 706 can include an approximately rectangular cavity that extends lengthwise in the longitudinal direction from the radiation slot 114 nearest to the opening of the zigzag waveguide channel 606 to the radiation slot 114 nearest the closed end of the zigzag waveguide channel 606. The cavities of the parasitic cavity elements 706 are sized and positioned to produce a radiation pattern with an asymmetrical radiation pattern.

Example Method

FIG. 8 illustrates an example method 800 that can be used for manufacturing a waveguide with radiation slots and parasitic elements for asymmetrical coverage, following techniques, apparatuses, and systems of this disclosure. Method 800 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1 and entities detailed in FIGS. 1 through 7, reference to which is made for example only. The techniques are not limited to performance by one entity or multiple entities.

At 802, a waveguide with radiation slots and parasitic elements for asymmetrical coverage is formed. For example, the waveguide 110, 202, 504, 604, and/or 704 can be stamped, etched, cut, machined, cast, molded, or formed in some other way.

At 804, the waveguide with radiation slots and parasitic elements is integrated into a system. For example, the waveguide 110, 202, 504, 604, and/or 704 is electrically coupled to the antenna 204 as part of the radar system 102.

At 806, electromagnetic signals with an asymmetrical radiation pattern are received or transmitted via the waveguide with radiation slots and parasitic elements at or by an antenna of the system, respectively. For example, the antenna 204 receives or transmits signals with an asymmetrical radiation pattern captured via the waveguide 110, 202, 504, 604, and/or 704 and routed through the radar system 102.

Examples

In the following section, examples are provided.

Example 1: An apparatus comprising: a waveguide including a hollow channel for a dielectric, the waveguide including: a plurality of radiation slots, each of the plurality of radiation slots comprising an opening through a surface of the waveguide that defines the hollow channel, each of the plurality of radiation slots being operably connected with the dielectric; and a plurality of parasitic elements positioned on or in the surface, one of the plurality of parasitic elements positioned adjacent to and offset from a longitudinal side of each radiation slot of the plurality of radiation slots, the longitudinal side being parallel with a longitudinal direction through the hollow channel, the plurality of parasitic elements and the plurality of radiation slots being arranged on the surface to produce an asymmetrical radiation pattern.

Example 2: The apparatus of example 1, wherein the waveguide includes a printed circuit board (PCB) having a first conductive layer, a second substrate layer, and a third conductive layer, wherein: the plurality of radiation slots is formed in the third conductive layer of the PCB; and the plurality of parasitic elements is formed in the first conductive layer of the PCB.

Example 3: The apparatus of example 1, wherein each of the plurality of parasitic elements is offset a distance from the longitudinal side of each radiation slot, the distance being selected to generate a particular band of coverage in the asymmetrical radiation pattern of an antenna element, the antenna element being electrically coupled to the dielectric from a floor of the hollow channel.

Example 4: The apparatus of example 1, wherein each of the plurality of parasitic elements has a height less than a depth of each of the plurality of radiation slots.

Example 5: The apparatus of example 1, wherein the plurality of parasitic elements has an approximately rectangular shape.

Example 6: The apparatus of example 1, wherein the plurality of parasitic elements has an approximately circular shape, oval shape, C shape, T shape, or L shape.

Example 7: The apparatus of example 1, wherein the hollow channel includes a second opening in the longitudinal direction at one end of the waveguide and a closed wall at an opposite end of the waveguide, the second opening being an approximately rectangular shape and the hollow channel forming another approximately rectangular shape along the longitudinal direction.

Example 8: The apparatus of example 7, wherein the plurality of radiation slots is offset a non-uniform distance from a centerline of the hollow channel, the centerline being parallel with the longitudinal direction.

Example 9: The apparatus of example 1, wherein the second opening comprises an approximately rectangular shape and the hollow channel forms a zigzag shape along the longitudinal direction through the hollow channel.

Example 10: The apparatus of example 9, wherein the zigzag shape comprises multiple turns along the longitudinal direction, each of the multiple turns having a turning angle between 0 and 90 degrees.

Example 11: The apparatus of example 9, wherein the plurality of radiation slots is positioned along a centerline of the hollow channel, the centerline being parallel with the longitudinal direction through the hollow channel.

Example 12: The apparatus of example 11, wherein the plurality of parasitic elements comprises an approximately rectangular dipole element that extends along the longitudinal direction of the waveguide, the approximately rectangular dipole element positioned adjacent to and offset from the longitudinal side of the plurality of radiation slots.

Example 13: The apparatus of example 7, wherein the second opening comprises an approximately square shape, oval shape, or circular shape.

Example 14: The apparatus of example 7, wherein the plurality of radiation slots is evenly distributed between the second opening and the closed wall along the longitudinal direction.

Example 15: The apparatus of example 1, wherein the waveguide comprises metal.

Example 16: The apparatus of example 1, wherein the waveguide comprises plastic.

Example 17: The apparatus of example 1, wherein the dielectric comprises air and the waveguide is an air waveguide.

Example 18: A system comprising: an antenna element; a device configured to transmit or receive electromagnetic signals via the antenna element; and a waveguide including a hollow channel for a dielectric, the hollow channel forming: a first opening in a longitudinal direction at one end of the waveguide; a closed wall at an opposite end of the waveguide; a plurality of radiation slots, each of the plurality of radiation slots comprising a second opening through a surface of the waveguide that defines the hollow channel, each of the plurality of radiation slots being operably connected with the dielectric; and a plurality of parasitic elements positioned on or in the surface, one of the plurality of parasitic elements positioned adjacent to and offset from a longitudinal side of each radiation slot of the plurality of radiation slots, the longitudinal side being parallel with the longitudinal direction through the hollow channel, the plurality of parasitic elements and the plurality of radiation slots being arranged on the surface to produce an asymmetrical radiation pattern for the antenna element that is electrically coupled to the dielectric from a floor of the hollow channel.

Example 19: The system of example 18, wherein the device comprises a radar system.

Example 20: The system of example 19, wherein the system is a vehicle.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. An apparatus comprising:
a waveguide including a hollow channel for a dielectric, the waveguide including:
a plurality of radiation slots, each of the plurality of radiation slots comprising an opening through a first layer that defines a surface of the hollow channel, each of the plurality of radiation slots being operably connected with the dielectric; and
a plurality of parasitic cavity elements each being a recess or cavity forming a depression within the surface of the first layer, the plurality of parasitic cavity elements each being positioned adjacent to and offset along the surface from a same longitudinal side of each radiation slot of the plurality of radiation slots such that each of the plurality of parasitic cavity elements overlaps a different and single one of the plurality of radiation slots in a direction perpendicular to a longitudinal direction through the hollow channel, the longitudinal side being parallel with the longitudinal direction through the hollow channel, the plurality of parasitic cavity elements and the plurality of radiation slots being arranged to produce an asymmetrical radiation pattern.

2. The apparatus of claim 1, wherein:
the waveguide includes a printed circuit board (PCB) having the first layer, a second layer, and a third layer, the first layer being a first conductive layer, wherein
the plurality of radiation slots and the plurality of parasitic cavity elements are formed in the first conductive layer with a depth of the plurality of parasitic cavity elements being less than a depth of the plurality of radiation slots, and
the hollow channel is within the second layer below the first layer.

3. The apparatus of claim 1, wherein each of the plurality of parasitic cavity elements is offset a distance from the longitudinal side of each radiation slot of the plurality of radiation slots, the distance being selected to generate a particular band of coverage in the asymmetrical radiation pattern of an antenna element, the antenna element being electrically coupled to the dielectric from a floor of the hollow channel.

4. The apparatus of claim 1, wherein each of the plurality of parasitic cavity elements has a rectangular shape.

5. The apparatus of claim 1, wherein the hollow channel includes a second opening in the longitudinal direction at one end of the waveguide and a closed wall at an opposite end of the waveguide, the second opening being a rectangular shape and the hollow channel forming another rectangular shape along the longitudinal direction.

6. The apparatus of claim 5, wherein each of the plurality of radiation slots is offset a non-uniform distance from a centerline of the hollow channel, the centerline being parallel with the longitudinal direction.

7. The apparatus of claim 5, wherein the plurality of radiation slots is evenly distributed between the second opening and the closed wall along the longitudinal direction.

8. The apparatus of claim 1, wherein the hollow channel includes a second opening in the longitudinal direction at one end of the waveguide and a closed wall at an opposite end of the waveguide, the second opening being a rectangular shape and the hollow channel forming a zigzag shape along the longitudinal direction through the hollow channel.

9. The apparatus of claim 8, wherein the zigzag shape comprises multiple turns along the longitudinal direction, each of the multiple turns having a turning angle between 0 and 90 degrees.

10. The apparatus of claim 8, wherein the plurality of radiation slots is positioned along a centerline of the hollow channel, the centerline being parallel with the longitudinal direction through the hollow channel.

11. The apparatus of claim 10, wherein the plurality of parasitic cavity elements comprises a rectangular cavity element that extends along the longitudinal direction of the waveguide, the rectangular cavity element positioned adjacent to and offset from the longitudinal side of the plurality of radiation slots.

12. The apparatus of claim 1, wherein the hollow channel includes a second opening in the longitudinal direction at one end of the waveguide and a closed wall at an opposite end of the waveguide, the second opening comprises a square shape, oval shape, or circular shape.

13. The apparatus of claim 1, wherein the waveguide is formed of metal.

14. The apparatus of claim 1, wherein the waveguide is formed of plastic.

15. The apparatus of claim 1, wherein the dielectric comprises air and the waveguide is an air waveguide.

16. A system comprising:
an antenna element;
a device configured to transmit or receive electromagnetic signals via the antenna element; and
a waveguide including a hollow channel for a dielectric, the waveguide including:
a plurality of radiation slots, each of the plurality of radiation slots comprising an opening through a first layer that defines a surface of the hollow channel, each of the plurality of radiation slots being operably connected with the dielectric; and
a plurality of parasitic cavity elements each being a recess or cavity forming a depression within the surface of the first layer, the plurality of parasitic cavity elements each being positioned adjacent to and offset along the surface from a same longitudinal side of each radiation slot of the plurality of radiation slots such that each of the plurality of parasitic cavity elements overlaps a different and single one of the plurality of radiation slots in a direction perpendicular to a longitudinal direction through the hollow channel, the longitudinal side being parallel with the longitudinal direction through the hollow channel, the plurality of parasitic cavity elements and the plurality of radiation slots being arranged to produce an asymmetrical radiation pattern.

17. The system of claim 16, wherein:
the device comprises a radar system; and
the system is a vehicle.

18. The system of claim 16, wherein:
the waveguide includes a printed circuit board (PCB) having the first layer, a second layer, and a third layer, the first layer being a first conductive layer, wherein
the plurality of radiation slots and the plurality of parasitic cavity elements are formed in the first conductive layer with a depth of the plurality of parasitic cavity elements being less than a depth of the plurality of radiation slots, and
the hollow channel is within the second layer below the first layer.

19. The system of claim 16, wherein each of the plurality of parasitic cavity elements is offset a distance from the longitudinal side of each radiation slot of the plurality of radiation slots, the distance being selected to generate a particular band of coverage in the asymmetrical radiation pattern of the antenna element, the antenna element being electrically coupled to the dielectric from a floor of the hollow channel.

* * * * *